United States Patent
Doukhvalov et al.

(10) Patent No.: US 9,582,335 B2
(45) Date of Patent: Feb. 28, 2017

(54) SYSTEM AND METHOD FOR DISTRIBUTING PROCESSING OF COMPUTER SECURITY TASKS

(75) Inventors: Andrey P. Doukhvalov, Moscow (RU); Yury V. Mashevsky, Moscow (RU); Anton V. Tikhomirov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 499 days.

(21) Appl. No.: 13/427,689

(22) Filed: Mar. 22, 2012

(65) Prior Publication Data
US 2013/0139165 A1 May 30, 2013

(30) Foreign Application Priority Data
Nov. 24, 2011 (RU) ................................ 2011147540

(51) Int. Cl.
G06F 9/50 (2006.01)
G06F 21/56 (2013.01)

(52) U.S. Cl.
CPC .......... G06F 9/5072 (2013.01); G06F 21/567 (2013.01)

(58) Field of Classification Search
CPC .................................................... G06F 9/5072
USPC ........................................................ 718/102
See application file for complete search history.

(56) References Cited

U.S. PATENT DOCUMENTS

| | | | |
|---|---|---|---|
| 4,964,077 A | 10/1990 | Eisen et al. | |
| 5,388,198 A | 2/1995 | Layman et al. | |
| 5,496,177 A | 3/1996 | Collia et al. | |
| 5,522,070 A | 5/1996 | Sumimoto | |
| 6,629,143 B1 | 9/2003 | Pang | |
| 6,650,322 B2 | 11/2003 | Dai et al. | |

(Continued)

FOREIGN PATENT DOCUMENTS

| | | |
|---|---|---|
| EP | 2180444 | 4/2010 |
| EP | 2388727 | 11/2011 |

(Continued)

OTHER PUBLICATIONS

D.L. Parnas, On the Criteria to Be Used in Decomposing Systems into Modules, 1972, Association for Computing Machinery, Inc., p. 1053-1058.*

(Continued)

*Primary Examiner* — Charlie Sun
(74) *Attorney, Agent, or Firm* — Patterson Thuente Pedersen PA

(57) ABSTRACT

In a computer system, processing of security-related tasks is delegated to various agent computers. According to various embodiments, a distributed computing service obtains task requests to be performed for the benefit of beneficiary computers, and delegates those tasks to one or more remote agent computers for processing. The delegation is based on a suitability determination as to whether each of the remote agent computers is suitable to perform the processing. Suitability can be based on an evaluation of such parameters as computing capacity and current availability of the remote agent computers against the various tasks to be performed and their corresponding computing resource requirements. This evaluation can be performed according to various embodiments by the agent computers, the distributed computing service, or by a combination thereof.

15 Claims, 14 Drawing Sheets

(56) References Cited

U.S. PATENT DOCUMENTS

| | | |
|---|---|---|
| 6,785,822 B1 | 8/2004 | Sadhwani-Tully |
| 7,003,547 B1 | 2/2006 | Hubbard |
| 7,152,172 B2 | 12/2006 | Tsirkel et al. |
| 7,243,373 B2 | 7/2007 | Muttik et al. |
| 7,487,348 B2 | 2/2009 | Kroening |
| 7,555,621 B1 | 6/2009 | Pavlyushchik |
| 7,636,764 B1 | 12/2009 | Fein et al. |
| 7,657,493 B2 | 2/2010 | Meijer et al. |
| 7,770,114 B2 | 8/2010 | Sriprakash et al. |
| 7,818,814 B2 | 10/2010 | Lu et al. |
| 7,891,001 B1 | 2/2011 | Greenawalt et al. |
| 7,962,914 B2 | 6/2011 | Caccavale |
| 7,979,515 B2 | 7/2011 | Morikawa |
| 8,010,703 B2 | 8/2011 | Hubbard et al. |
| 8,037,527 B2 | 10/2011 | Milener et al. |
| 8,397,087 B1 * | 3/2013 | Gardner et al. ............ 713/300 |
| 8,443,363 B1 * | 5/2013 | Brennan, III ....... G06F 9/45558 711/147 |
| 2001/0052008 A1 | 12/2001 | Jacobus |
| 2002/0004814 A1 | 1/2002 | Tanaka |
| 2005/0138186 A1 * | 6/2005 | Hesselink et al. ............ 709/229 |
| 2005/0273456 A1 * | 12/2005 | Revanuru ............... G06F 9/505 |
| 2005/0283786 A1 * | 12/2005 | Dettinger ............. G06Q 10/10 718/104 |
| 2007/0233827 A1 | 10/2007 | McKnight |
| 2007/0266436 A1 | 11/2007 | Ballard et al. |
| 2007/0300312 A1 | 12/2007 | Chitsaz et al. |
| 2008/0091613 A1 | 4/2008 | Gates et al. |
| 2008/0109245 A1 | 5/2008 | Gupta |
| 2008/0109473 A1 | 5/2008 | Dixon et al. |
| 2008/0133741 A1 | 6/2008 | Kubota |
| 2008/0141335 A1 | 6/2008 | Thomas |
| 2008/0195597 A1 * | 8/2008 | Rosenfeld et al. ............ 707/5 |
| 2008/0209434 A1 * | 8/2008 | Queck ................... G06F 9/5033 718/105 |
| 2009/0031312 A1 * | 1/2009 | Mausolf et al. ............ 718/102 |
| 2009/0133015 A1 * | 5/2009 | Nagashima ............... 717/176 |
| 2009/0157419 A1 | 6/2009 | Bursey |
| 2009/0178132 A1 | 7/2009 | Hudis et al. |
| 2009/0210244 A1 | 8/2009 | Koister et al. |
| 2009/0228950 A1 | 9/2009 | Reed et al. |
| 2009/0234907 A1 | 9/2009 | Lary et al. |
| 2009/0254998 A1 | 10/2009 | Wilson |
| 2009/0282476 A1 | 11/2009 | Nachenberg et al. |
| 2009/0307428 A1 * | 12/2009 | Schmieder et al. .......... 711/118 |
| 2009/0328034 A1 | 12/2009 | Corcoran et al. |
| 2010/0027552 A1 | 2/2010 | Hill |
| 2010/0061250 A1 | 3/2010 | Nugent |
| 2010/0125903 A1 | 5/2010 | Devarajan et al. |
| 2010/0132016 A1 | 5/2010 | Ferris |
| 2010/0153945 A1 * | 6/2010 | Bansal et al. .................... 718/1 |
| 2010/0153955 A1 * | 6/2010 | Sirota et al. ................. 718/102 |
| 2010/0169497 A1 | 7/2010 | Klimentiev et al. |
| 2010/0179856 A1 | 7/2010 | Paretti et al. |
| 2010/0238840 A1 | 9/2010 | Lu et al. |
| 2010/0251328 A1 | 9/2010 | Syed et al. |
| 2010/0287280 A1 | 11/2010 | Sivan |
| 2011/0035248 A1 | 2/2011 | Juillard |
| 2011/0173247 A1 | 7/2011 | Hubbard et al. |
| 2011/0209140 A1 | 8/2011 | Scheidel et al. |
| 2011/0258702 A1 | 10/2011 | Olney et al. |
| 2011/0289308 A1 | 11/2011 | Sobko et al. |
| 2013/0019251 A1 * | 1/2013 | Kumar et al. ................ 719/318 |
| 2013/0074088 A1 * | 3/2013 | Purcell ................... G06F 9/4881 718/103 |
| 2013/0080522 A1 * | 3/2013 | Ren ..................... H04L 12/6418 709/204 |

FOREIGN PATENT DOCUMENTS

| | | |
|---|---|---|
| EP | 2472425 | 7/2012 |
| RU | 92551 | 3/2010 |
| RU | 101229 | 1/2011 |
| RU | 2454714 | 6/2012 |
| WO | WO2007142478 | 12/2007 |
| WO | WO2008131446 | 10/2008 |
| WO | WO2008150710 | 12/2008 |
| WO | WO2010060139 | 6/2010 |
| WO | WO2011117243 | 9/2011 |

OTHER PUBLICATIONS

Summons to Attend Oral Proceedings communication from European Patent Office for European Application No. 12164876.0 dated Mar. 19, 2014.

Oberheide et al., "CloudAV: N—Version Antivirus in the Network Cloud", Jan. 1, 2008.

European Communication for European Application No. 12164876.0 dated Mar. 18, 2013.

Okamoto, "A Distributed Approach to Computer Virus Detection and Neutralization by Autonomous and Heterogeneous Agents", Nara Institute of Science and Technology. May 31, 2004.

Nov et al., "Volunteer Computing: A Model of the Factors Determining Contribution to Community-based Scientific Research", Apr. 26-30, 2010.

Anderson, "High-Performance Task Distribution for Volunteer Computing". Space of Sciences Laboratory. 2005.

Belaramani et al., "Dynamic Component Composition for Functionality Adaptation in Pervasive Environments", Dept. of Computer Science and Information Systems. 1997.

Moti, "A Component-based Software System with Functionality Adaptation for Mobile Computing", The University of Hong Kong. 2002.

European Search Report for European Application No. EP12164876 dated Aug. 14, 2012.

Camargo et al., "Grid: An Architectural Pattern", 11th Conference on Pattern Languages. Sep. 12, 2004.

Goldchleger et al., "InteGrade: object-oriented Grid Middleware Levering the Idle Computing Power of Desktop Machines", vol. 16, No. 5. Apr. 25, 2004.

Ferreira et al., "Introduction to Grid Computing with Globus", Sep. 2003.

Buschmann et al., 3.3 Organization of Work (the Master-Slave pattern), Pattern-Orientated Software Architecture. vol. 1. Aug. 16, 1996.

* cited by examiner

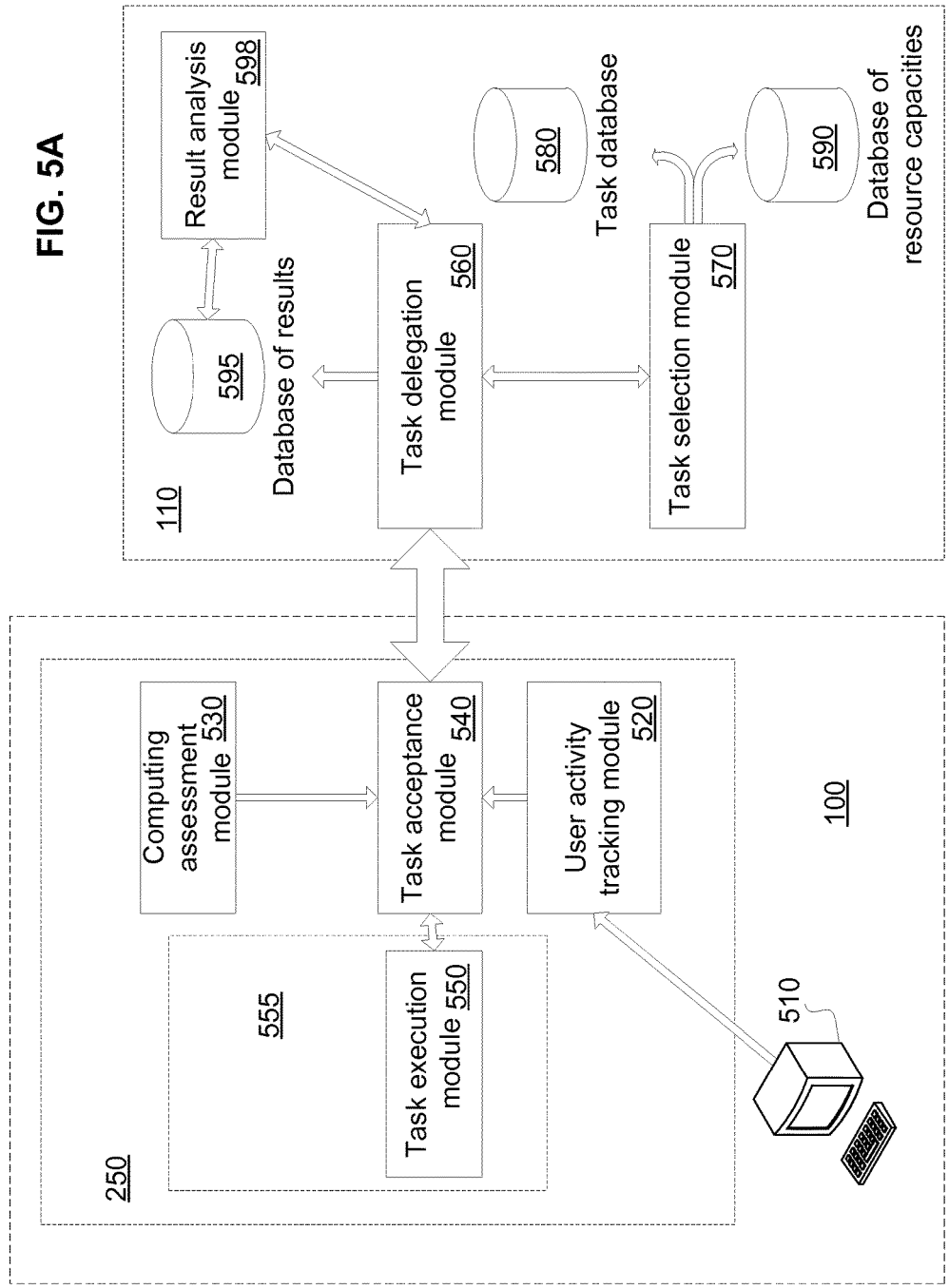

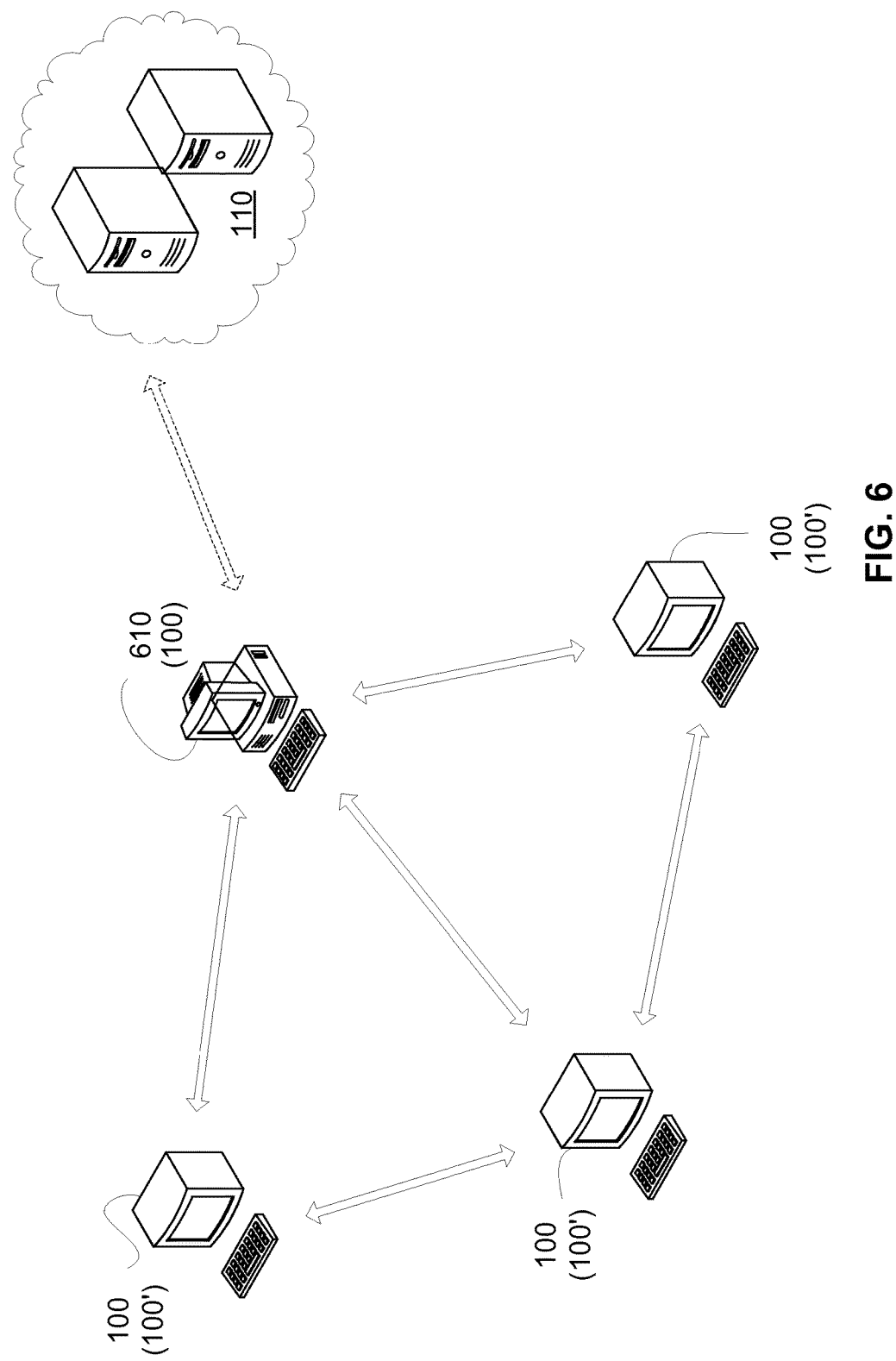

SYSTEM AND METHOD FOR DISTRIBUTING PROCESSING OF COMPUTER SECURITY TASKS

PRIOR APPLICATION

This Application claims priority to Russian Federation Patent Application No. 2011147540 filed Nov. 24, 2011, the disclosure of which is incorporated by reference herein.

FIELD OF THE INVENTION

The invention relates generally to information systems security and related methods and, more particularly, to distributing processing of information security-related operations utilizing a computer network.

BACKGROUND OF THE INVENTION

Currently, anti-virus software companies are faced with the fact that in recent years the growth of the number of security threats exceeds all conceivable bounds. Security threats include a variety of malicious software such as trojans, worms, viruses and other unwanted software, as well as links that lead to web pages with malware and other unwanted software, vulnerabilities in software licensing, etc. The category of unwanted software can also include programs intended to commit financial crimes ("crimeware"), tracking of user actions ("spyware"), blocking data from or performance of a victim's computer ("ransomware").

The number of new, unique, threats is growing exponentially. At the same time, the capabilities of anti-virus companies—both hardware resources and manpower (expert analysts)—are limited by comparison, such that increasing them at the same rate at which the number of threats increases is impossible. One of the reasons for the growth of malicious software is the massive development of the communications infrastructure, particularly the Internet, and the corresponding rapid growth of the number of users. This in turn brings the growth of various services that are offered online: Internet banking, virtual money (such as Web-Money), messaging, blogs, software-as-a-service, and the like. The present generation of so-called computer criminals has evolved from previous generations of vandals and those seeking to make political statements through their activities, to more sophisticated financial criminals who have learned to develop malicious software and organize network attacks to steal funds through theft extortion, or fraud. In recent years, their activity has affected not only the banking sector (e.g., Trojan bankers), but also switched to theft of accounts for popular online games, as well as extortion by programs such as Trojan-Ransom. Their success and growth are attributed to a number of factors: inadequate protection of many online services, the inadequacy or complete absence of laws in some countries relating to offenses occurring on the Internet, and sometimes simple ignorance regarding computer security by computers users.

In computer security applications, the use of conventional threat detection methods such as signature and heuristic analysis, cannot simply scale with the rate of growth of the threats. The constantly increasing number of malicious programs makes development and dissemination of new antiviral records for detecting new malware very difficult. Likewise conventional monitoring of the Internet for newly-created sites which spread malicious software and infect computers cannot scale with the rate of creation of these malicious sites.

All these problems lead to the fact that anti-virus applications can miss malicious software (such as when the malware databases are incomplete or out-of-date), false positives and false negatives (i.e., a trusted application can be incorrectly detected as malware), etc. On the other side of the balance, anti-virus applications that are designed to deal with the huge volume of potential threats tend to put unreasonable burdens on the computing resources of computer systems, which tends to stifle the user experience.

Along with the growth of malicious software, the world of legitimate software is also growing. This presents added challenges of inspecting increasing numbers of programs in order to deem them trusted applications for whitelisting. This, too, results in rapidly-expanding demands on anti-virus applications which cannot be met by simple scaling.

Anti-virus companies have been harnessing the power of their user network to some extent. In a typical example, users are invited to participate in reporting, to the anti-virus company, the results of the detection of malware or analysis of unknown programs carried out by their locally-running systems. These reports are then analyzed, synthesized with similar reports, and incorporated by the anti-virus company into a malware database to be periodically updated and disseminated to all users of their service. In this basic model, the entire network of users gets the benefit of the first user's detection of a new piece of malware. This benefit, however, is delayed by the reporting, review, analysis/synthesis, and database update cycle time between the first user's detection of a piece of malware and the protection against that malware that is eventually disseminated.

A more effective solution is needed to counter the rate of expansion of security threats.

SUMMARY OF THE INVENTION

One aspect of the invention is directed to distributed processing of security-related tasks. According to various embodiments, a distributed computing service obtains task requests for tasks to be performed for the benefit of beneficiary computers, and delegates those tasks to one or more remote agent computers for processing. The task requests can be initiated by the beneficiary computers themselves, or by one or more other computers acting on behalf of the beneficiary computers. The delegation is based on a suitability determination as to whether each of the remote agent computers is suitable to perform the processing. Suitability can be based on an evaluation of such parameters as computing capacity and current availability of the remote agent computers against the various tasks to be performed and their corresponding computing resource requirements. This evaluation can be performed according to various embodiments by the agent computers, the distributed computing service, or by a combination thereof.

In a related aspect, a computer system for operation in a distributed computation system in which security-related tasks are delegated includes computing hardware (e.g., a processor, a memory device, a user interface, and a communications interface), a plurality of protection modules interfaced with the computing hardware and adapted to cause the computing hardware to perform various security-related operations for a user of the computer system, and a distributed processing module. The latter includes a task acceptance module adapted to gather information necessary for a determination of availability of the computer system to accept delegation of at least one task requested to be performed for the benefit of a beneficiary computer via a distributed computing service; and a task execution module adapted to obtain the at least one task delegated from the beneficiary computer via the distributed computing service in response to the determination of availability of the computer system, and to execute the at least one task via at least one of the plurality of protection modules.

In another related aspect, a computer system includes a distributed computing service module adapted to receive a request for distribution of security-related tasks to be performed for the benefit of at least one remote beneficiary computer; and delegate the requested security-related tasks to at least one remote agent computer for execution in response to a suitability determination as to whether each of the at least one remote agent computer is suitable to perform the execution.

It is contemplated for some embodiments that a single computer system can include a distributed processing module, and a distributed computing service module, though other embodiments may have these modules not combined in a single computer system.

According to another aspect of the invention, a computer-readable medium comprises instructions that, when executed by a computer system, cause the computer system to perform various security-related operations for a user of the computer system, gather information necessary for a determination of availability of the computer system to accept delegation of at least one task requested to be performed for the benefit of a beneficiary computer via a distributed computing service, and obtain the at least one task delegated from the beneficiary computer via the distributed computing service in response to the determination of availability of the computer system, and to execute the at least one task via at least one of the plurality of protection modules.

In a particular embodiment, the instructions are further adapted to cause the computer system to receive a request for distribution of security-related tasks from at least one remote beneficiary computer, determine computing capacity requirements for executing each of the requested security-related tasks, and delegate the requested security-related tasks to at least one remote agent computer for execution in response to a suitability determination as to whether each of the at least one remote agent computer is suitable to perform the execution.

In another aspect of the invention, a computer-readable medium comprises instructions that, when executed by a computer system, cause the computer system to receive a request for distribution of security-related tasks from at least one remote beneficiary computer, and delegate the requested security-related tasks to at least one remote agent computer for execution in response to a suitability determination as to whether each of the at least one remote agent computer is suitable to perform the execution.

In yet another aspect of the invention, a method for delegating security-related processing of tasks includes receiving a request for distribution of security-related tasks from at least one remote beneficiary computer; and delegating the requested security-related tasks to at least one remote agent computer for execution in response to a suitability determination as to whether each of the at least one remote agent computer is suitable to perform the execution.

BRIEF DESCRIPTION OF THE DRAWINGS

The invention may be more completely understood in consideration of the following detailed description of various embodiments of the invention in connection with the accompanying drawings, in which:

FIG. 5A is a block diagram illustrating a system of selecting and delegating tasks to users of a distributed computing service according to one embodiment.

FIG. 6 is a block diagram illustrating an example system in which tasks are delegated to various agent computers or combination computer systems by either a dedicated distributed computing service, or by any one of combination computer systems having the same basic functionality of a distributed computing service according to various embodiments.

Figure 1:
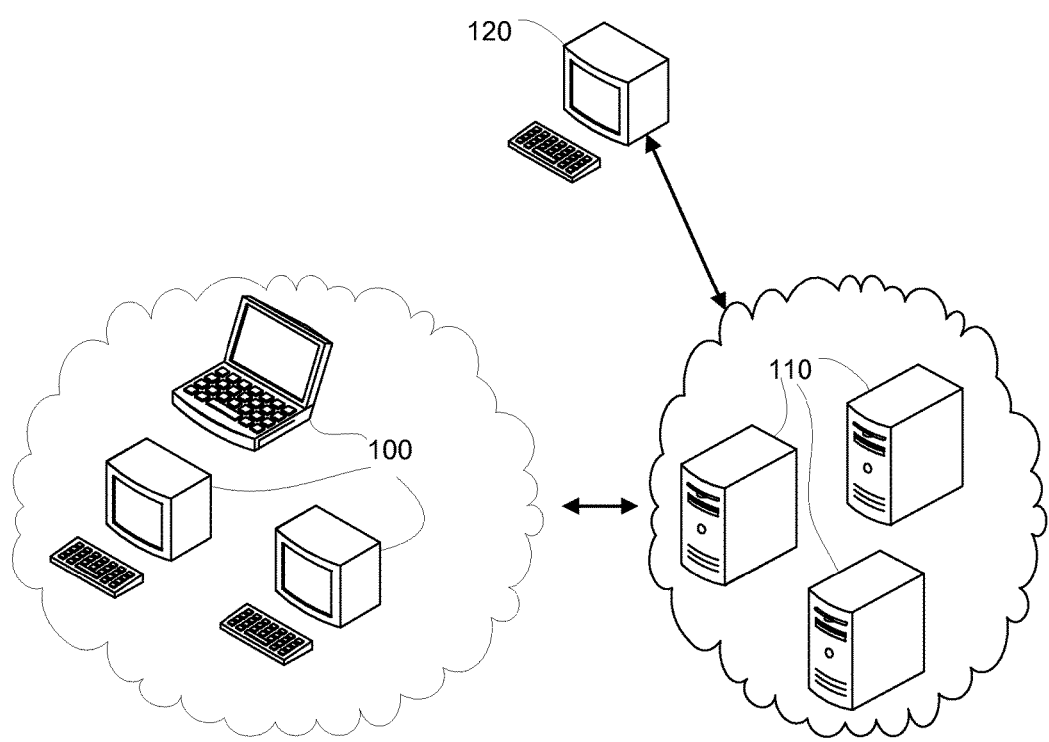
FIG. 1 is a diagram illustrating a distributed computation system according to one embodiment of the invention in which the computing resources include agent computers that receive tasks to be performed from a distributed computing service.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 is a diagram illustrating a distributed computation system according to one embodiment, in which the computing resources include agent computers 100. Each of these agent computers 100 is a general-purpose PCs having a task execution application installed on it to perform the tasks delegated by distributed computing service 110. In certain embodiments of the invention, the task execution application is incorporated as part of a security suite of protection modules such as the example depicted in FIG. 2. The task execution is performed for the benefit of beneficiary computer 120, which receives the benefit of the distributed processing. In one type of embodiment, beneficiary computer 120 requests the distributed processing for various reasons, such as, for instance, an inability to take on a detected problem due to a lack of available resources at beneficiary computer 120 e.g., because beneficiary computer 120 has insufficient computing power, insufficient security functionality for performing the necessary task, or because the existing resources are occupied.

In one type of embodiment, a single PC can be equipped to function in multiple roles such that, for example, at a first time, the PC can act as a beneficiary computer 120, at a second time as a distributed computing service 110, and at a third time as an agent computer 100, depending on the prevailing circumstances at each of those times.

As examples of a suitable architecture for the implementation of distributed technologies, various embodiments utilize grid architecture, or an architecture based on peer to peer (P2P) networks.

Grid technology is based on the concept of the pooling of resources through the creation of computer infrastructure for the global integration of information resources on the basis of standard networking technology, specialized software and a set of standardized services that provide shared access to geographically distributed resources (processors, long-term memory, storage, and databases). The use of grid technology requires the construction of complex distributed structures, which have to ensure high quality of service requests, subject to the universal use of standard open protocols and interfaces. The use of grid technology is suitable for the following classes of tasks: mass flow processing of large amounts of data, multivariate data analysis, modeling on remote supercomputers, realistic visualization of large data sets, complex business applications with large amounts of computation.

One model of the use of grid technology is the grid system at CERN, which has a multi-level hierarchical system. The zeroth level collects data from detectors ("raw" data), the first level stores copies of the data around the world, whereas the second level (implemented as multiple data centers) carries out data processing using a plurality of computing centers.

As part of the architecture based on peer to peer (P2P) networks which are in turn based on the equality of the participants with no dedicated servers, and each node (peer) is both a client and a server. Unlike client-server architecture, this type of organization can work over a network of any size and with any combination of available nodes. The following characteristics are important for P2P architecture: the sharing of computer resources by direct exchange without the assistance of intermediaries, the ability to treat instability and volatility of the compounds as the norm, automatically adapting to disconnects and failure of computers, as well as the variable number of nodes.

Figure 2:
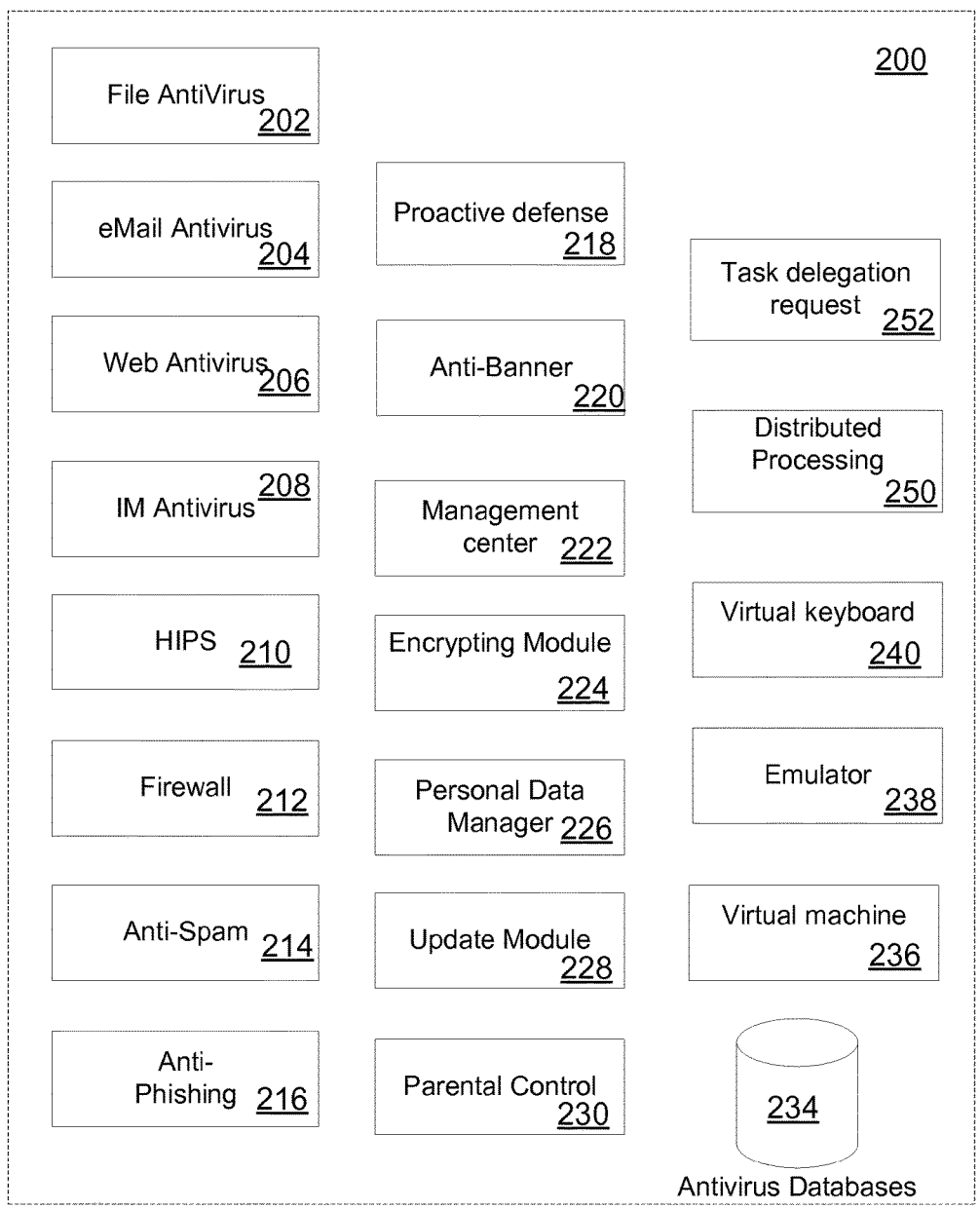
FIG. 2 is a basic block diagram illustrating various protection modules of a security suite running on a personal computer.

FIG. 2 is a block diagram illustrating various protection modules of a computer security suite 200 implemented as part of a computer system. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, or other such techniques. Accordingly, each module can be realized in a variety of suitable configurations, and should not be limited to any particular implementation exemplified herein.

The protection modules of security suite 200 can be called upon to operate on behalf of the local user of the computer system. In agent computer 100, the protection modules can also be called upon to operate on behalf of the beneficiary computer 130. Security suite 200 includes file antivirus module 202 that applies various techniques to detect possible malicious code in files and either repair a file suspected of being infected, or isolate the file from being able to cause harm. Email antivirus module 204 is specifically geared toward scanning incoming emails for malware. Instant message antivirus module 208 is likewise adapted to scan and block unintended instant messages. Host-based intrusion prevention system module (HIPS) 210 controls specific system events (for example, file creation or deletion), and each time these events occur, HIPS 210 applies its rule set to allow or block the action. Firewall module 212 controls traffic into and out of the computer system, along with access privileges for remote users. Anti-spam module 214 filters incoming email (and, in some cases, outgoing email as well) to prevent the spread of unsolicited email (spam). Anti-phishing module 216 is a content analysis system that recognizes phishing and pharming attacks and takes appropriate preventive and protective action. Proactive defense module 218 is adapted to analyze system behavior to detect unknown threats based on suspicious behaviors, such as intrusion into processes, setting operating system hooks, creating suspicious registry entries, and the like. Anti-banner module 220 controls and limits, if appropriate, the actions of banner ads, which can display unwanted advertisements in an Internet browser and report certain user activities to a third party (spyware).

Management center module 222 provides a centralized user interface with controls to access settings for the various other modules. Each module usually has its own interactivity with the user. Thus, for instance, an anti-spam module offers the option to self-learn certain protections, such as the formation of lists of trusted and blocked senders, lists of permitted and obscene phrases, etc. HIPS Module 210 allows the user to set and change the access rights to computer resources for specific programs to make a variety of programs trusted, and form program groups according to their credibility. Thus, each module has its own degree of prompting of the user for additional information. Despite the fact that the work of most modules is automatic, some actions still require a decision to be made by the user.

Encrypting module 224 provides cryptographic tools for secure communications and file securing operations. Personal data manager module 226 provides a secure and convenient data store for personal information such as account numbers, usernames and passwords. Update module 228 is designed primarily to update the antivirus database 234, which ensures the reliability of its functionality. Anti-virus database 234 may contain, for example, signatures of known malware or the set of data necessary for the functioning of anti-spam module 214, etc. Also, external services should be considered as antivirus databases, such as databases of the antivirus vendors, which may have a large bank of knowledge, such as database of white lists, which contains information about trusted applications. Parental control module 230 provides selective filtering of Web browsing content and other functionality to prevent access to content that may be inappropriate for children.

Some of the modules are essential for the security suite—such as update module 228 or file antivirus module 202. Depending on the use of different features, like e-mail or the Internet, various other modules are required, such as e-mail anti-virus 204, web anti-virus 206, IM anti-virus 208, and firewall module 212. Others are complimentary tools: anti-spam module 214 to filter incoming e-mail, backup module, manager of personal data (which provides isolation and safety of critical data), a virtual keyboard module 240 that enables secure input thereby eliminating fear of programs such as keyloggers.

Some modules require a lot of time and resources for their operation, but are able to cope with as-yet unknown malware and attacks. These modules include HIPS module 210, which restricts access to computer resources for unknown programs, proactive defense module 218 capable of determining the active phase of infection (i.e., a time when a malicious program has already started to work on the computer), as well as an emulator module 238 and virtual machine module 236 needed to safely run the unknown executable files.

Modern anti-virus applications will generally detect threats while performing certain scheduled tasks (for example, scanning the hard drives), as well as during the user's active interaction with the PC, such as when the user operates a Web browser to view Internet sites, launches applications, overwrites files, etc. If the user is not actively interacting with the PC, then the proactive actions of anti-virus software are generally limited to downloading of security updates (e.g., malware or spam signatures) and periodic functioning (e.g. disk scanning). Aspects of the invention recognize that, under these circumstances, the available computing resources of the PC tend to be under-utilized.

Embodiments described herein include distributed processing module 250 that allows security suite 200 to participate as an agent to carry out such processing on behalf of another computer in such a network. Task delegation request module 252 automatically recognizes an opportunity to benefit from distribution of processing security-related tasks using a network of available computer systems, and initiates a request for delegation of tasks. Tasks that can be solved by multiple processors (or cores of a processor) of one or more computers (that are an example of parallel computing) are contemplated.

Examples of computer security problems that can be performed with a number of computers can serve the following objectives (note that this list is only exemplary and may be extended to other tasks related to computer security):

1. Collection of WHOIS information. The advantage of collecting this information is that WHOIS information is very important to track the reputation of the domain, as this information includes both e-mail addresses and phone numbers of owners of domains that can be used to register new domains. In this case, WHOIS information is received registration data about the owners of domain names, IP-addresses and autonomous systems. Typically, such information is kept by registrars, but they do not allow for frequent queries of their WHOIS databases from the same computer (IP-address).

2. Creating and updating the list of trusted sites (whitelist). The advantage of collecting this information is in the globalization of this list with the possibility of regional lists.

3. The division of the databases of various modules of the antivirus application into smaller pieces for testing on the client side. The advantage of this method of testing is the reduction of time delay when checking for new entries in the database. Furthermore, in addition to databases of computer security suite 200, the modules themselves may be tested.

4. Checking sites for the presence of malware with a script emulator on the client side. Test results (link to the site, the verdict) are collected centrally in distributed computing service 110. The advantage of this test include constant control over the majority of known sites on the Internet (based on grouping by the verdicts, i.e. categorization of sites).

5. Periodic inspection of sites using a parental control module to prevent access to inappropriate content. The advantage of this test is timely correction of false positives and quick reaction to changes in the analyzed sites.

6. Exchange of anti-virus database updates between users through peer-to-peer technology. The advantage of this exchange: less traffic between the autonomous systems and reducing the burden on update service of the antivirus company.

7. Local exchange of information about infections among users (for example, for a local network). This task provides capabilities for the sending of unknown files (or links to them) to check to more productive (or more feature-rich modules for computer security suite 200) users. The advantage of such information sharing: reducing the load on the server of anti-virus company.

8. Detection of unknown malicious programs based on comparison of extracted features with the characteristics of known malicious programs or files. Such a problem is characterized by high resource consumption (comparing with the database of all the characteristics of known malicious programs can take minutes or hours), but for achievement of good results, database of all the characteristics of known malicious programs can be divided into several parts, each of which can be processed on a separate computer, which allows improving response time to a few seconds.

Distributed computing service 110 performs operations for ascertaining the requirements for executing each of the requested tasks, and appropriately delegating those tasks to agent computers 100. According to one type of embodiment, any task that is similar to those above is characterized by several parameters: the operational parameters of the task itself, as well as its average execution time and conditional resource requirements. Conditional resource use depends on the dynamic parameters of the problem according to a predetermined formula (usually evaluated empirically or determined on the basis of statistical data). Each of the parameters directly or indirectly affects resource use, for example, by increasing the number of items for testing. Resource consumption can grow in direct proportion to the number of objects. Average execution time determines the duration of the task on a given computer with a known capacity. Typically, the average time of task execution can be obtained by running the task on a reference machine with known hardware and software capabilities, and then either approximating, e.g., by interpolating or extrapolating the performance based on differences between the computer system on which the task is estimated to be performed, and on the reference machine.

One of the parameters to be considered is the time allowed for the execution of the task. For example, the detection of unknown malicious programs based on comparison of extracted features with the characteristics of malicious software should not exceed a few seconds, as users do not want to wait long for the analysis of an unknown program. Thus, when finding computers that meet the parameters of a specific task, the consumption of computer resources for the timing of the task is assessed and if one wants to perform another task (or part thereof) over a short period of time when the computer is busy, the computer will not be used to perform the task.

The files to be scanned may serve as the operational parameters of the task, for example, an operational parameter may be a list of addresses of sites to check with the parental control module or a set of unknown files in order to compare them with the database of characteristics of known malicious programs. Also, settings may be specified as parameters and associated with the task.

Another parameter is the number of computers upon which the task can be executed. The optimum number of computers is derived based on the computing capacity needed to perform tasks within the specified time. The task can be performed as part of a distributed run time using an optimal number of specific computers in the event that the optimum number of computers for satisfying the requirements of the specific task is less than the total number of computers available that meet the parameters of the specific task. The task can be performed as part of a distributed implementation using all of the available specific computers in the event that the optimum number of computers that satisfies the requirements of the specific task is greater than the available number of computers. In a related embodiment, the time and resources needed for breaking the task into separate parts to be processed on separate computers are also taken into account. Certain tasks may be more amenable to being divided into a certain number of parts such that breaking the task into still further parts would be counter-productive.

Having determined the range of tasks, one aspect of the invention considers several points related to the direct fulfillment of these tasks on a number of agent computers 100, namely: determining computing capacity of the computer, determining the availability of computer resources, and defining of tasks available for execution. These considerations are addressed in various embodiments collectively by agent computers 100 and distributed computing service 110. In one of these embodiments, agent computers 100 determine their respective computing capacities and availability, and distributed computing module 110 determines the computing capacity requirements for the various tasks that may be distributed. The decision to determine the tasks available for execution on each agent computer 100 can be performed by distributed computing service 110 based on information from each agent computer 100 regarding its capacity and availability or, in another embodiment, each agent computer can make the determination based on the task requirements for a proposed task provided by distributed computing service 110.

Figure 3A:
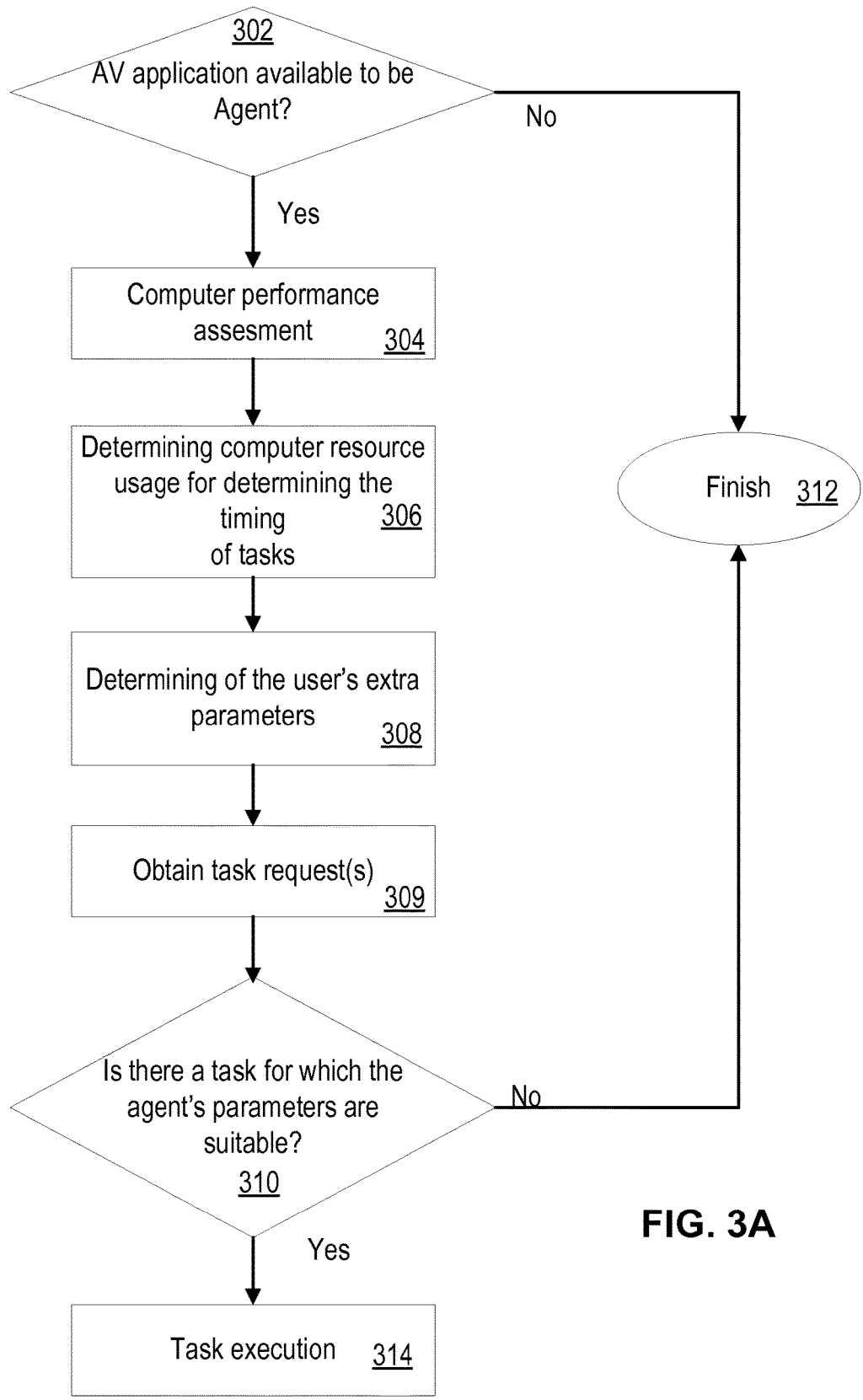
FIG. 3A is a flow diagram illustrating a process carried out by an agent computer to assess capability to perform tasks for other computers according to one embodiment

FIG. 3A illustrates a process carried out by an agent computer 100 to assess capability to perform tasks for other computers according to one embodiment. At 302 information about the anti-virus application on the agent computer 100 is checked. The information about the current anti-virus application includes such items as the version of antivirus software, its exact identity, build number, the identity of the patch, license information, etc. License information can be especially important in some cases because the license is directly related to the user license agreement (EULA), which defines the scope of the rights for a copy of the application. For example, when buying a paid anti-virus application, the user gets a license for a certain period (e.g. 1 year), while the use of free anti-virus application is not limited to general terms. In addition, the user license agreement can also determine the amount of action that can be done with the data on the user's computer and, in particular, which distributed tasks can be performed on the user's computer. In that case if, for example, the license does not allow the use of computer resources for distributed task processing, the process ends at 312.

At 304 the agent computer's performance is checked. Many programs, such as HD Tune, PCMark Vantage, 3DMark Vantage, SiSoftware Sandra, and the like, are able to evaluate a variety of resources on a scale that corresponds to computed values from recognized performance tests. In various examples, assessments of computing power can include the video card or CPU processing capacity, hard drive or network connection throughput capacity, etc. Note also that recent versions of Microsoft Windows also present performance evaluation of components of the computer.

Thus, by using various methods of evaluation (or from the manufacturer specifications), information about the key characteristics of the various resources of the computer can be obtained in some suitable unit of measure. For example, the following available information is utilized according to one embodiment:

CPU (computing performance, the number of cores, clock speed, architecture);
Memory (capacity, throughput MB/sec);
Hard disk (throughput capacity KB/sec);
Network (connection bandwidth Mb/sec).

In a simplified approach, only one critical parameter that is most important is bound to each resource. For example, for central processing unit (CPU) one may enter a conditional performance index, which will depend on a number of the parameters listed above:

CPU performance may be calculated using the following formula: (the coefficient for the number of cores)*(clock frequency)*(coefficient of performance of the architecture).

Thus, one can estimate the system in the form of some suitable score for each resource. For example, a computer having the characteristics as follows: {CPU: P4 3.0 Ghz, RAM: 512 MB, HDD: 500 Gb 5200 Rpm, NIC: 10 Mbit/sec}; the assessment can be represented as 3000/512/65000/10000. For a Core i7 configuration of 2.66 Ghz/4096 Mb/SSD 160 Gb/30 Mbit the score can be 10000/4096/200000/30000. Of course, these figures are rather arbitrary and are for illustrative and comparative purposes only. Another factor that affects performance is the operating system. Amount of resources consumed is also quite well known, although for each computer, these values can vary, but one can assume that the average values are known. One can also establish a limit of consumption of resources, depending on the number of installed updates, and OS settings.

Defining the system productivity score as a number that determines the performance of the system as a whole, one can calculate the approximate time of execution of the given task on a system as follows:

Task execution time for the given system=(average execution time)*(given system performance/test system performance)*(task parameters modifier), where the average execution time determines the duration of the task with given parameters on a computer with a known capacity (test system), and parameters modifier determines the complexity of the task.

Figure 3B:
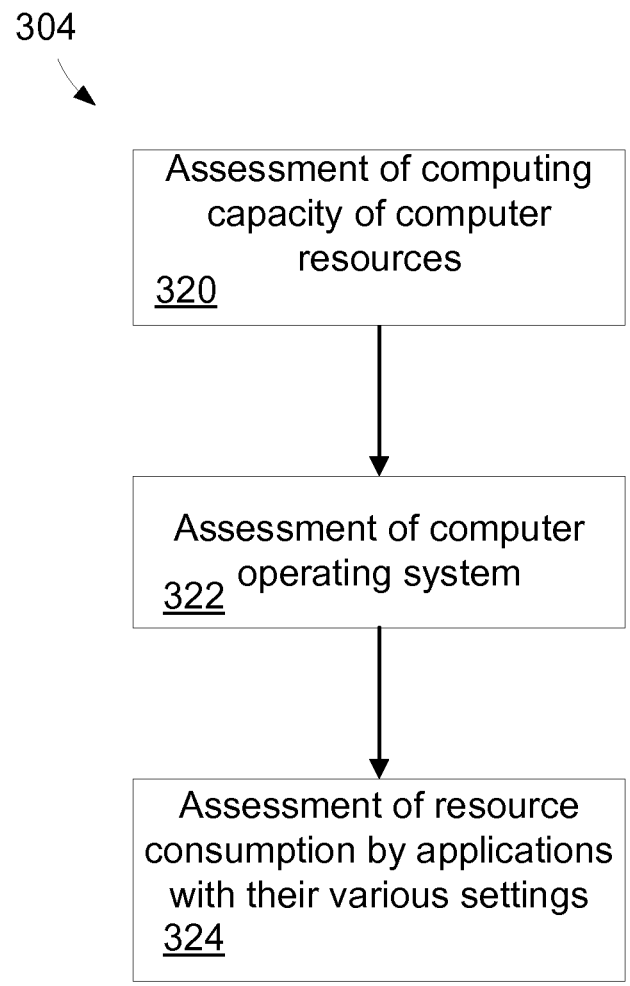
FIG. 3B is a block diagram illustrating a process of assessing the resources of a computer system according to one embodiment of the invention.

FIG. 3B illustrates an example process of assessing the resources of a computer system that takes place at 304. At 320 is the performance evaluation of computer resources by the above methods. Also, evaluation of the OS that is installed on the computer occurs at 322. Evaluation of the consumption of resources by different applications installed by the user takes place at 324.

In a related embodiment, a system of fuzzy logic is used. The system of fuzzy logic involves three stages:

1. Fuzzification—the introduction of fuzziness. To perform this operation all input variables are defined by linguistic variables, for each linguistic variable term-sets are constructed, for each term—fucntions of membership. For example, for the linguistic variable "processor capacity" the term-set will look like {"very low", "low", "medium", "high", "very high"}, which allows one to move away from precise numerical values.

2. Creating and using a fuzzy knowledge base. The fuzzy knowledge base includes production rules of the form IF <premise> THEN <conclusion>. For example, one can use the following rule: "If the CPU is high, the performance of the system is high." The construction of such rules does not usually cause trouble because they are clear and are a kind of "verbal encoding."

3. Defuzzification—getting a clear output value, which in this case is the evaluation of computer performance.

Any task that is running on a computer uses the basic computer resources—especially CPU time, memory, hard drive space. At some point one or more running tasks can lead to a lack of resources and, as a result, frustration of the user. Thus, one embodiment takes into account not only the performance of the computer as a whole, but also the time when the user uses the computer's resources for their own purposes, so as not to load additional tasks at this time.

Once the computer's performance measure(s) has been determined at 304, computer evaluation of resource consumption by the users themselves takes place at 306. More specifically, the resource needs of the user's applications are analyzed in order to determine the time required to perform active tasks.

One of the options of estimating consumption of computer resources by the user provides tracking of user activity on the computer. Any one of a number of suitable ways is contemplated, for example, using a detector, camera or input devices, to determine user presence or activity.

Figure 3C:
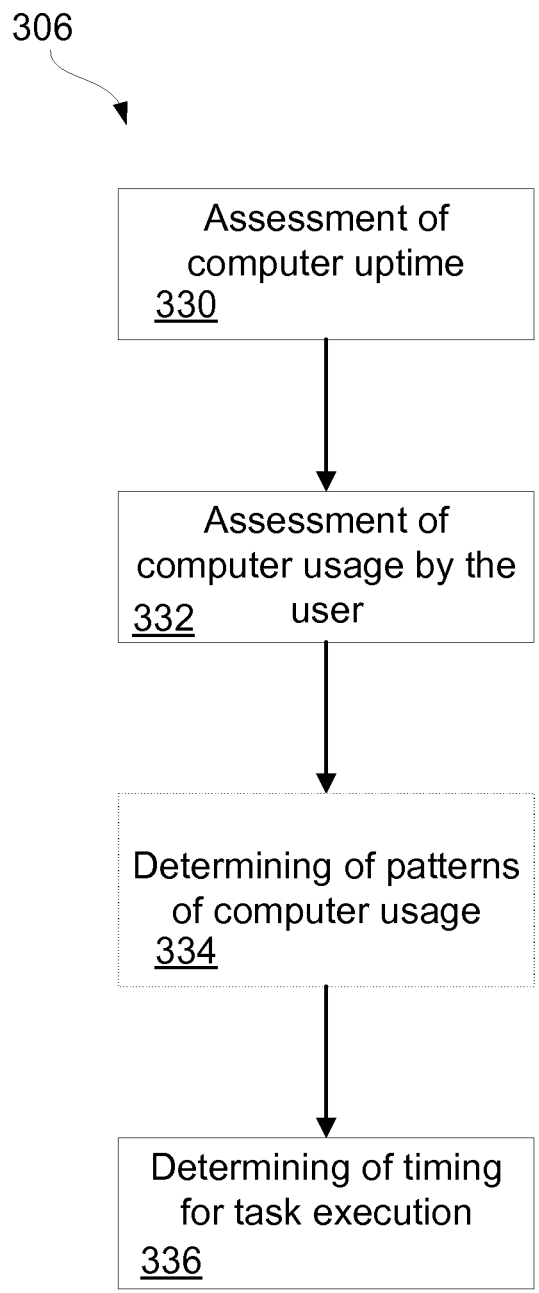
FIG. 3C is a flow diagram illustrating a process of determining the present consumption of computer resources, which can be used to determine the availability of an agent computer to accept distribution of tasks.

FIG. 3C illustrates an example process of determining the consumption of computer resources for the timing of the tasks that occur at 306. Estimation of the duration of the computer's operation, i.e., the time during which the computer was turned on, occurs at 330. Next, at 332 the nature of use of computer resources by the user is evaluated according to one or more of the techniques discussed above. In certain embodiments, at 334, patterns of use of the computer by its user are determined. As an example, the time-of-use trends for the time of day or night, and day of week, during which the user normally uses the computer, and times during which the computer tends to be idle are ascertained. In one approach, a ratio of the time of use of computer resources by the user to the computer up-time, as well as idle time which can be used to perform tasks, is computed. Based on the information determined at 330-334, one or more task distribution time windows are ascertained for the computer system at 336. These time windows represent preferred times during which the particular computer system is a likely good candidate to perform tasks distributed to it.

Referring back to the example embodiment of FIG. 3A, additional user parameters may be taken into account at 308, such as: the possibility of a large number of infections causing failure of the anti-virus software due to attempts by the malicious programs to end the processes of all known anti-virus applications, a variety of information about conflicts with other antivirus software applications on the PC that can affect the effectiveness of tasks, etc. Based on the collected information, the system determines its capability for executing various tasks.

In one type of embodiment, each agent computer 100 determines its own computing performance, resource usage, etc. In another type of embodiment, each agent computer gathers and provides information from which a computing performance determination can be made by a remote device, such as distributed computing service 110.

Figure 3D:
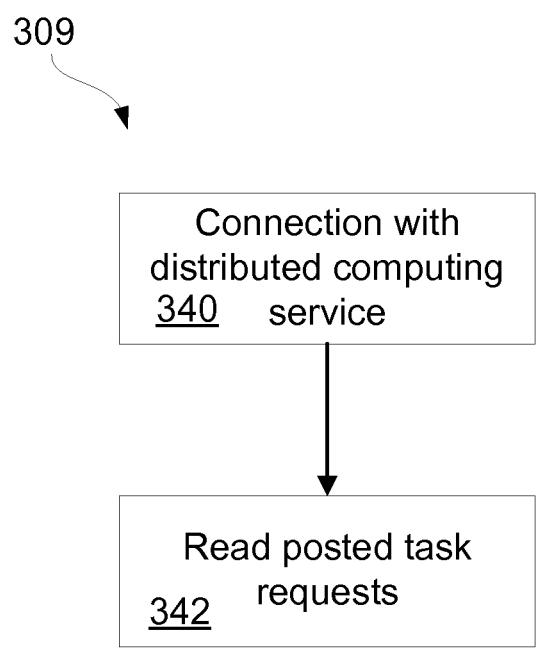
FIG. 3D is a flow diagram illustrating an exemplary process for obtaining task requests in which the agent computer 100 pulls task requests from the distributed computing service according to one embodiment.

At 309, agent computer 100 obtains one or more task requests from distributed computing service 110. FIG. 3D illustrates an exemplary process for block 309 according to one embodiment in which agent computer 100 "pulls" task requests from distributed computing service 110. At 340 a connection is initiated between agent computer 100 and distributed computing service 110. This connection can be initiated by agent computer 100 according to one embodiment. In the communication session that is established, distributed computing service 110 provides a listing of task requests of tasks to be distributed, and their various requirements. At 342, agent computer 100 reads the listing of task requests.

Figure 3E:
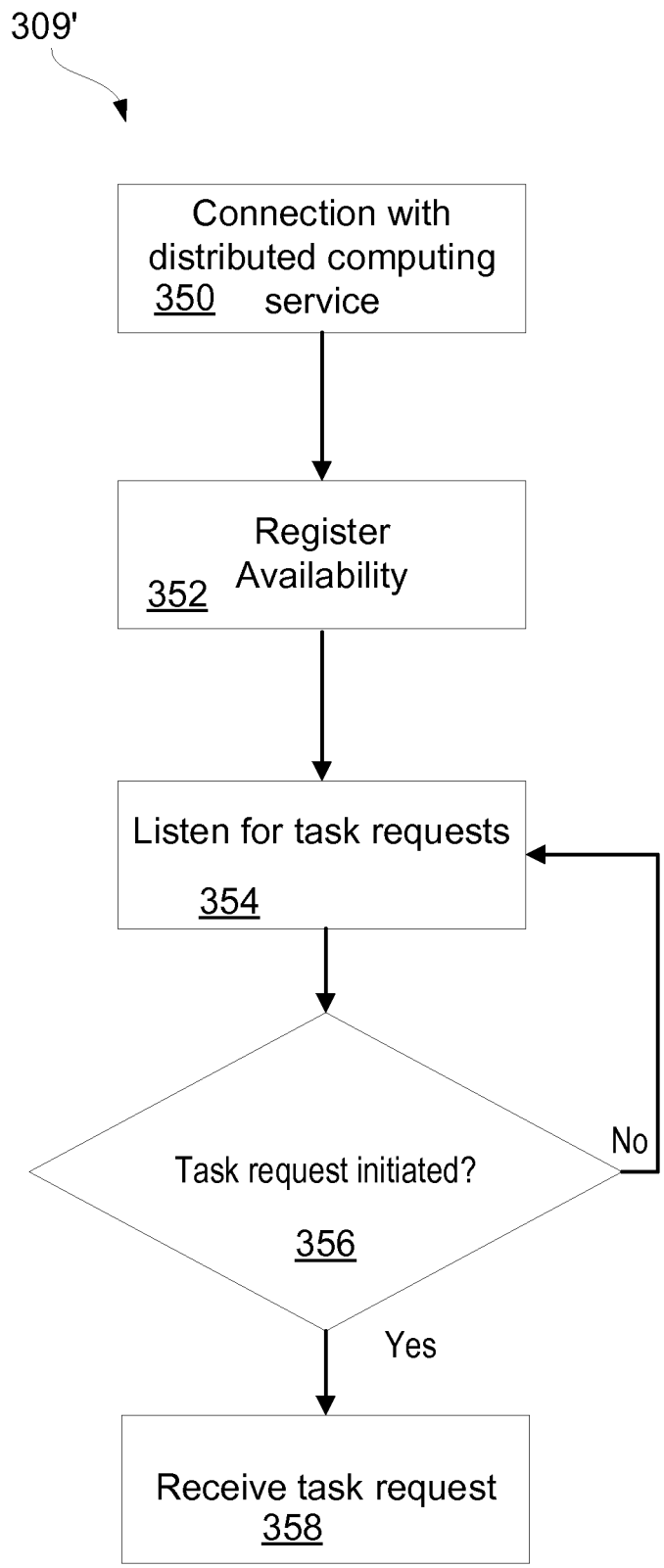
FIG. 3E is a flow diagram illustrating another example process for obtaining task requests in which the distributed computing service pushes task requests to the agent computer according to another embodiment.

FIG. 3E illustrates a related embodiment of block 309', which is a variant of block 309 above. In block 309' tasks are "pushed" to agent computer 100. At 350, a connection is established with distributed computing service 110. At this stage, task requests may or may not be present. At 352, agent computer 100 informs distributed computing service 110 of its availability. This may be in the form of a registration in which agent computer 100 indicates its existence, and in certain embodiments, additionally indicates its processing or task execution capabilities, its availability, or both. At 354, agent computer 100 listens for subsequent task requests directed to it. At 356 an incoming task request is either not detected or detected. If there is no task request, the process loops back to listening at 354; otherwise, at 358, the task request is received.

Referring back to FIG. 3A, at 310, a decision is made as to the suitability of agent computer 100 to perform any of the one or more task requests. This decision is based on the parameters of the requested task(s), and the parameters determined at blocks 304-308. If there is a suitable match, at 314 the agent computer 100 is delegated the task for execution. The decision at 310 can be performed by agent computer 100, as illustrated; however, in other embodiments, the decision can be made by distributed computing service 100 based on capability and availability information provided to it by agent computer 100, or the decision may be made collectively with certain portions being decided by distributed computing service 110, and other portions decided by agent computer 100. For example, the capacity of agent computer 100 to perform a particular task can be determined at distributed computing service 110; whereas the present availability of agent 100 to take on the process can be determined by agent computer 100.

In a related embodiment, the execution of the tasks at block 314 takes place while reserving priority for the use of resources of the user's computer. This is achieved by lowering the priority of processes in which the tasks are performed, while user applications (browser, office applications, games, etc.) are high-priority applications with respect to computer resources.

Figure 4:
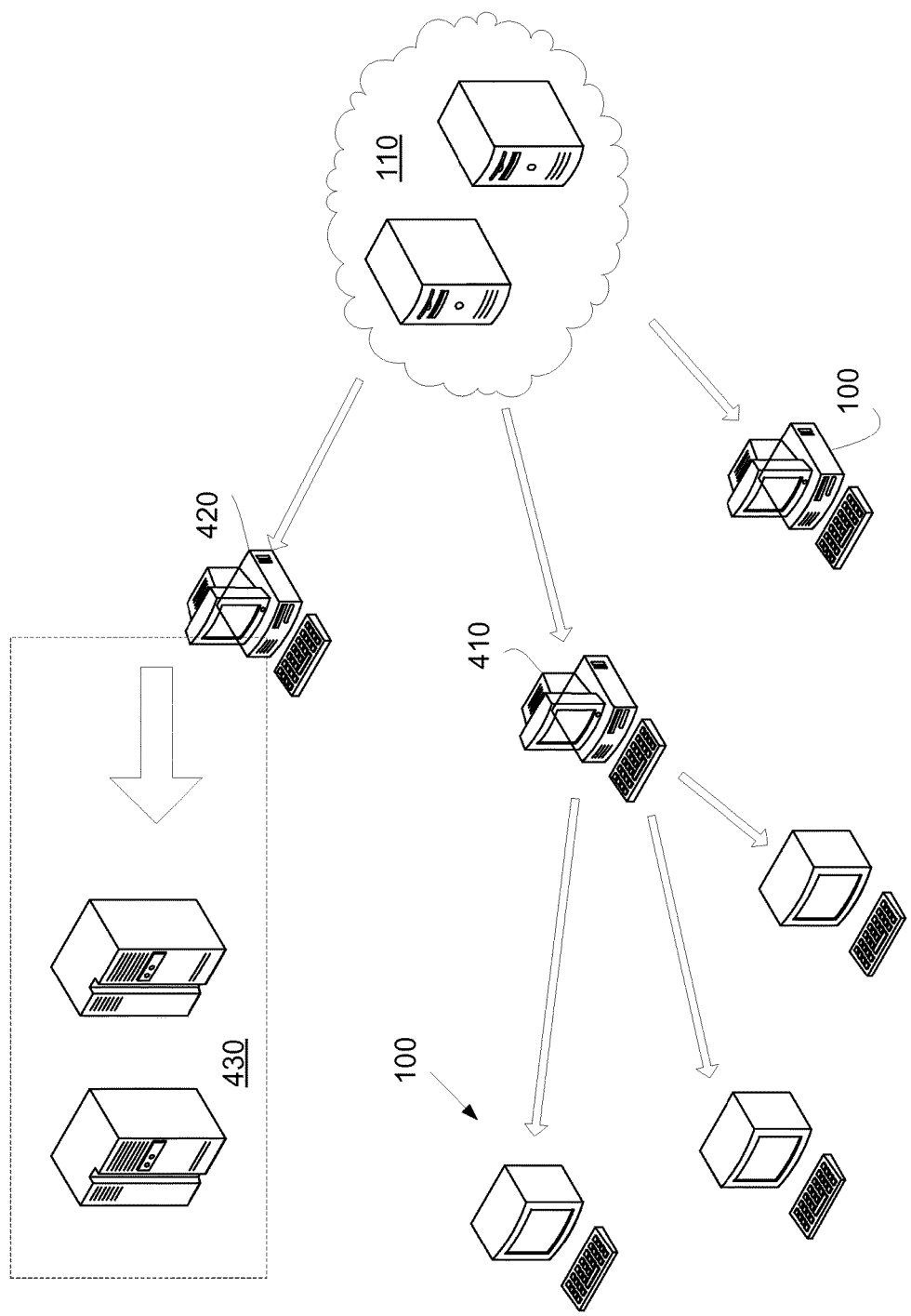
FIG. 4 is a block diagram illustrating various ways of delegating tasks to users of distributed computing according to embodiments of the invention.

FIG. 4 illustrates various ways of delegating tasks to users of distributed computing according to embodiments of the invention. The simplest embodiment includes providing a direct delegation of tasks from distributed computing service 110 directly to the agent computer 100. In a related embodiment, an intermediary computer 410 is used to reduce the load on the bandwidth of the distributed computing service 110. The selection of the intermediary computer 410 can be implemented, for example, based on the topology of the network that is running the intermediary computer 410. Such intermediary computer 410 can be used for certain functions of distributed computing service 100, e.g., storage of tasks and the results of the processing, thus reducing the amount of traffic to the distributed computing service 110. In this regard, distributed computing service 110 can itself be distributed among multiple distinct computer systems. In related embodiments, intermediary computer 410 can also be an agent computer 100, or a beneficiary computer 120 at various times.

In a related embodiment, the delegation of tasks is suitable for a large number of computing resources, such as dedicated servers 430 to implement distributed applications. To do this, an intermediary computer 420 implements distributed computing service 110 that delegates tasks to dedicated servers 430. In related embodiments, intermediary computer 420 can also be an agent computer 100, or a beneficiary computer 120 at various times.

The computer security suite 200 installed on these computers has full access to computing resources and can perform a wider range of tasks, such as using antivirus software module configured for maximum protection, ensuring the most complete unknown object data gathering. For example, this way a full journal of emulation of the unknown program can be produced and analyzed.

FIG. 5A illustrates a system of selecting and delegating tasks to users of a distributed computing service according to one embodiment. A computer user interfaces with agent computer 100 via user interface 510. The interaction of the user with user interface 510 is tracked by user activity tracking module 520. User activity tracking module 520 is adapted to record the time that the user spends on agent computer 100, and the level of usage of computing resources, for instance, using the process described above with reference to FIG. 3C. Computing assessment module 530 determines the level of computing capacity of agent computer 100 as a whole and its individual components (for example, using the process described above with reference to FIG. 3B), as well as consumption of these resources by other applications that the user may be running. Data obtained from user activity tracking module 520 and computing assessment module 530 is provided to task acceptance module 540, which determines the availability of agent computer 100 for accepting delegation of tasks to be processed. Task acceptance module 540 is coupled with task execution module 550, which is adapted to execute the distributed tasks on agent computer 100. In one embodiment, task execution module 550 is implemented in an isolated environment 555, such as a sandbox or virtual machine, which isolates and protects the other local processes and their resources from the distributed task and its data, which could include dangerous files.

In the embodiment shown, modules 520, 530, 540, and 550 are components of distributed processing module 250 of computer security suite 200. It should be appreciated, however, that in other embodiments one or more of these modules may be implemented as part of one or more applications that are distinct from computer security suite 200, but have the capacity to interact with computer security suite 200, such as the ability to call up one or more of its modules.

In response to a determination, by task acceptance module 540, that the agent computer 100 is available to receive tasks to be delegated to agent computer 100, task acceptance module 540 sends an availability notification to task delegation module 560 indicating such availability. In one particular embodiment, the notification includes parameters indicating the computing capacity and availability schedule of agent computer 100. In a related embodiment, the notification parameters include information from which the computing capacity and availability can be determined by distributed computing service 110.

The task delegation module 560 is a component of distributed computing service 110. The task delegation module 560 handles communication with task acceptance module 540 and coordinates the passing of information in that communication with task selection module 570. In one such embodiment, information from task acceptance module 540 is relayed to task selection module 570. In another embodiment, certain items of information from the notification are extracted and processed by task delegation module 560 prior to communication with task selection module 570. In a related embodiment, task selection module 570 obtains information about the agent computer's processing capabilities and its components and configuration thereof; and information about the usage of the agent computer's resources by the user. This information is used for determining the tasks to be performed by querying database of tasks 580, which contains all the task-related data necessary for the tasks to be executed, and a database of resource capacities 590, which contains information about the requirements for computing resources for each specific type of tasks. In one example, the following parameters are taken into account:

- The type of task (e.g., testing databases of different modules of the antivirus application).
- Requirements for the performance of the computer and for the individual components. This information will be compared with data from computing assessment module 530 and user activity tracking module 520.
- Requirements for the installed modules of computer security suite 200. This data can be compared, for example, with data from computer security suite 200, which is installed on the computer 100.
- The amount of data used by the task itself and the task's particular parameters.
- Timing of the task execution, which can be calculated based on the availability of computer resources and time of their possible use.

Having defined the objective of the task and the requirements for carrying it out, task selection module 570 passes this information defining to task delegation module 560, which distributes the task for remote processing by agent computer 100. Various ways are contemplated within the spirit of the invention for distributing the processing of tasks. As discussed above, tasks may be delegated by "pushing" them by task delegation module 560 to task acceptance module 540 of one or more agent computers 100, or tasks may be published by task delegation module 560 so that they can be read and "pulled" by task acceptance module 540 of one or more agent computers 100.

In a related embodiment, tasks can be broken up into parts to be executed in parallel. For instance, multiple different agent computers 100 can be asked to apply different non-overlapping portions of their anti-virus databases so that each performs fewer computations and the overall result can be completed sooner. In another example, network analysis tasks to detect harmful websites can be distributed such that each agent computer 100 browses a different part of the World Wide Web or Internet.

On the agent side, in response to obtaining a task, task acceptance module 540 verifies a current existence of a period of user inactivity and sends the task to task execution module 550 for processing. Once the task is complete the task execution module 550 sends the results to task acceptance module 540, which in turn sends the results of execution to the distributed computing service's 110 task delegation module 560.

At the distributed computing service 110, the results are stored in database of results 595 and reported to beneficiary computer 120. Result analysis module 598 reads the results of the task processing that are returned to task delegation module by the one or more agent computers 100, and determines if the task has been sufficiently completed. In one embodiment, this determination is made based on a comparison of the results and the task parameters, one or more of which can specify the requirements for results of task processing. For example, if a task is broken into a plurality of parts which are distributed to multiple agent computers 100, result analysis module 598 confirms that all of the parts have been completed. In another example, where a task is distributed to multiple agent computers 100 for the purpose of obtaining the fastest outcome, the first-received result is deemed by result analysis module 598 to be the complete result, and the other agent computers 100 can be instructed to stop processing the task.

In a related embodiment, result analysis module 598 combines and reconciles various different results for multiple distinct tasks that are related to a common objective. For example, where an objective is to analyze an unknown file for the presence of malware, multiple different methods may be utilized—specific signature analysis based on known malware identifiable from malware database, generic signatures using heuristic methods, sandboxing and other virtualization techniques, etc. Each of the malware analysis methods can be distributed as one or more tasks, and the results among the methods may differ. In this case, result analysis module 598 can be adapted to compare the various results, and apply decision logic to identify the best result. The criteria for what constitutes the best result can vary from task-to-task depending on the parameters of each task.

In a related example, a single task can be distributed to multiple agent computers that happen to have different versions of an anti-virus database. Result analysis module 598 determines that the best result is the one from an agent computer 100 having the most recently-updated anti-virus database. In a variation of this embodiment, result analysis module 598 applies multiple competing criteria for determining a best result. For instance, in the last example, the best result may be further bound by timing considerations, such that the best available result within a predefined time window is the prevailing result.

In one type of embodiment, the results of certain tasks are not only returned to beneficiary computer 120, but are disseminated among multiple other agent computers 100 that are participants in the distributed processing system. Thus, for example, the discovery of a new piece of malware or harmful website can be communicated to all agent computers 100 so that all participating computers can benefit from this new knowledge.

Figure 5B:
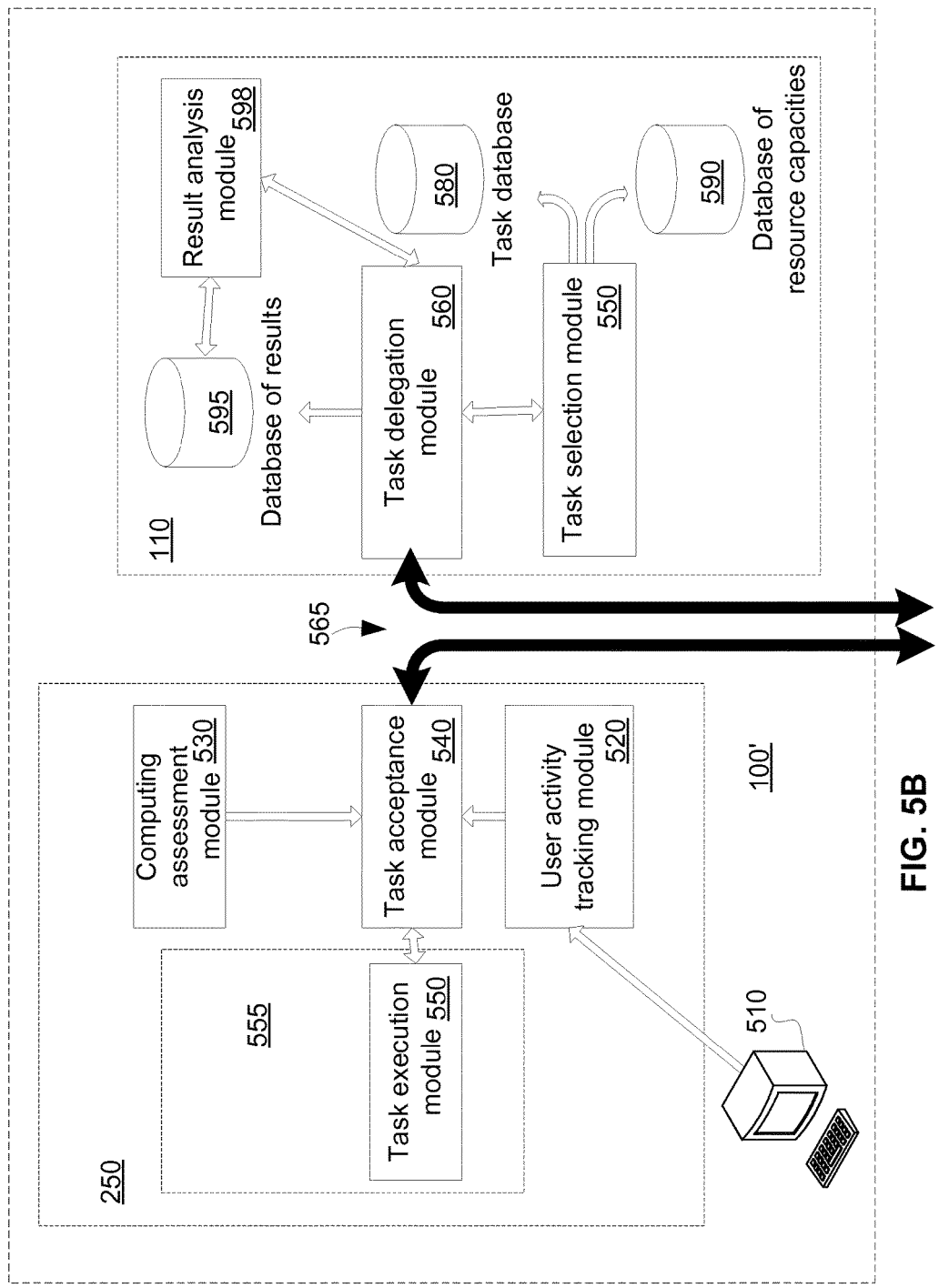
FIG. 5B is a block diagram illustrating a related embodiment in which one or more combination computer systems are configured with modules enabling them to serve as both, an agent, and a distributed computing service.

FIG. 5B is a block diagram illustrating a related embodiment in which (one or more) combination computer systems 100' is configured with modules enabling it to serve as both, an agent, and distributed computing service 110. In this embodiment, task acceptance module 540 and task delegation module 560 are each adapted to be communicatively coupled via interface 565 to an additional distribution service 110 (not shown) and to another agent computer 100 (not shown). In the embodiment depicted in FIG. 5B, distribution service 110 is a module implemented in computer system 100' separately from security suite 200. In a related embodiment, distribution service 110 is a module that is a part of distributed processing module 250.

FIG. 6 is a diagram illustrating an example system embodiment in which tasks are delegated to various agent computers 100 or combination computer systems 100' by either a dedicated distributed computing service 110 (such as an Internet-based service hosted remotely, for example), or by any one of combination computer systems 100' having the same basic functionality. In one approach, an intermediary computer 410 (discussed above with reference to in FIG. 4) is utilized, which can be a dedicated intermediary computer in one embodiment, or which can also be implemented with an agent computer 100 in a related embodiment. In the case where one or more combination computer systems 100' are employed, agent computers 100 interact directly with the combination computer system 100' for requesting and receiving delegation of tasks.

Figure 7:
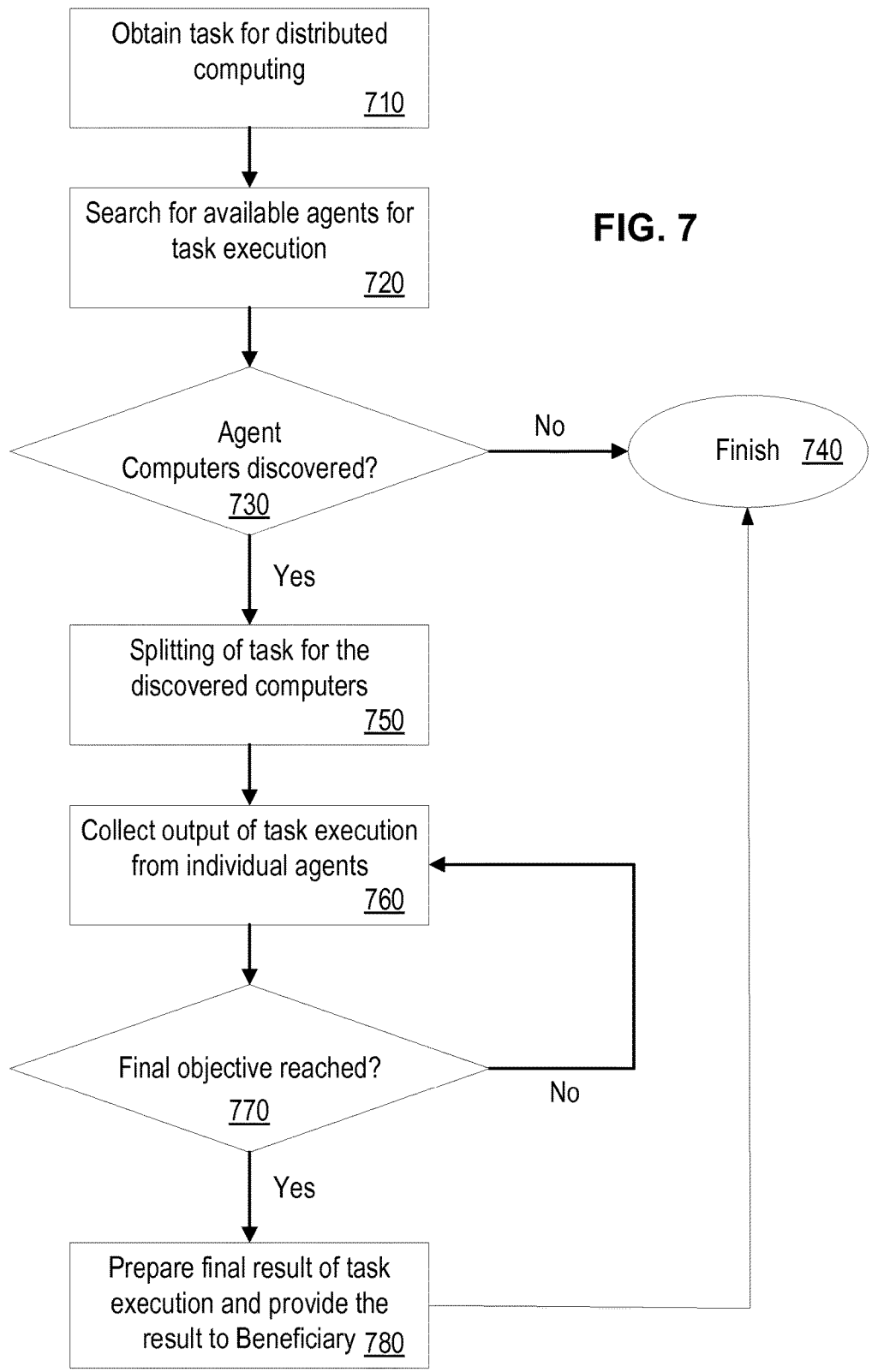
FIG. 7 is a flow diagram illustrating a process for distributing task execution to one or more agent computers, as carried out by a distribution service according to one example embodiment.

FIG. 7 is a flow diagram illustrating a process for distributing task execution to one or more agents, as carried out by distribution service 110 according to one example embodiment. As described above, distribution service 110 can be implemented as a service by a non-agent computer system, or it can be implemented as part of a combination computer system 100' which is also an agent.

At block 710 the task for distributed execution is obtained from beneficiary computer 120, which can be a computer system having security suite 200 or some subset thereof. Beneficiary computer 120 may be an agent computer 100, or may not be configured to execute processes on behalf of another computer system. Moreover, beneficiary computer 120 may be a module of combination computer system 100' communicating with a locally-hosted distribution service 110.

A typical example of a task to be distributed is the task of determining the harmfulness of an unknown file at beneficiary computer 120. Another example of a task to be distributed is performing an update, which can be particularly urgent if the anti-virus company's server can not timely disseminate updates (this might occur during a denial of service (DoS) attack or blocking of access to antivirus company server by unknown malware). The task can be distributed for execution on one or more agent computers 100 or combination computers 100' in those cases when the problem cannot be solved at beneficiary computer 120. For the sake of brevity hereinbelow, combination computers 100' operating in their capacity as agents will be referred to simply as agent computers 100.

At 720, the search for computers to execute such a task takes place. Such a search could involve, for example, a broadcasted request within the available segment of the network to detect computers with installed computer security suite 200 and presently-available computing resources that are sufficient to execute the task. In a related embodiment, the mailslot protocol is utilized to make such a broadcast. Responses to the broadcast are collected and analyzed. In a related embodiment, a predetermined optimal number of computers to perform each task is sought based on the task parameters.

In a related type of embodiment, each agent computer 100 has pre-registered its availability schedule and capabilities for taking on distributed tasks with one or more distribution services 110, such that the search essentially involves the distribution service 110 simply checking its registry of available agent computers 110. In this type of embodiment, an additional check is made prior to delegation of the task to ensure the actual present availability of the registered agent computers, since a particular agent computer 100 may be in use contrary to a typical usage schedule determined for that agent computer 100, and therefore unavailable as an agent for distributed task processing.

In distributing the task to one or more agent computers 100, it is most likely that one or more agent computers 100 other than beneficiary computer 120 that first discovered a need to perform a security task will execute the task. However, it is also possible that the distribution process, which generally involves a determination of suitability and condition for performing the task, will find that executing the process (or a portion of the process) locally on beneficiary computer 120's computer is the best course of action under the circumstances. This situation applies in embodiments where beneficiary computer 120 is also an agent computer 100.

Whether the computers that meet the criteria to perform a specific task are discovered is determined at block 730. The criteria may include requirements for the computer's performance and its availability, and are detailed in the description above with reference to FIGS. 3-5. If no such computers are found, then the method ends at block 740. Otherwise, at block 750 the task is split in order to perform distributed execution according to the number of available computers. Once the task is split onto discovered agent computers 100, it is executed by the agent computers, each of which reports its output back to distribution service 110. At block 760, distribution service 110 collects the individual agent computer 100 outputs.

At decision 770 distribution service 110 determines if the overall objective for the distributed task is reached. The criteria for making this determination can vary according to the task's requirements. For instance, to complete some tasks, such as checking a file against all known pieces of malware with the malware database having broken up among the various agent computers 100, it may be necessary that all agent computers 100 complete their portion of the distributed task. Other tasks may require only a first agent computer 100 to complete its task, at which point the other agent computers may be called off. One example of this type of task is analyzing an unknown program heuristically in an isolated sandbox environment. Various engines and analysis techniques may be used at different agent computers 100, but if a first agent computer 100 discovers that the file is malicious, the others may be notified to cease processing.

At block 780 the final result is put together by combining the various agents computers' 100 outputs or by selecting the first or most appropriate output, as the case may be, and providing the result to beneficiary computer 120.

Figure 8:
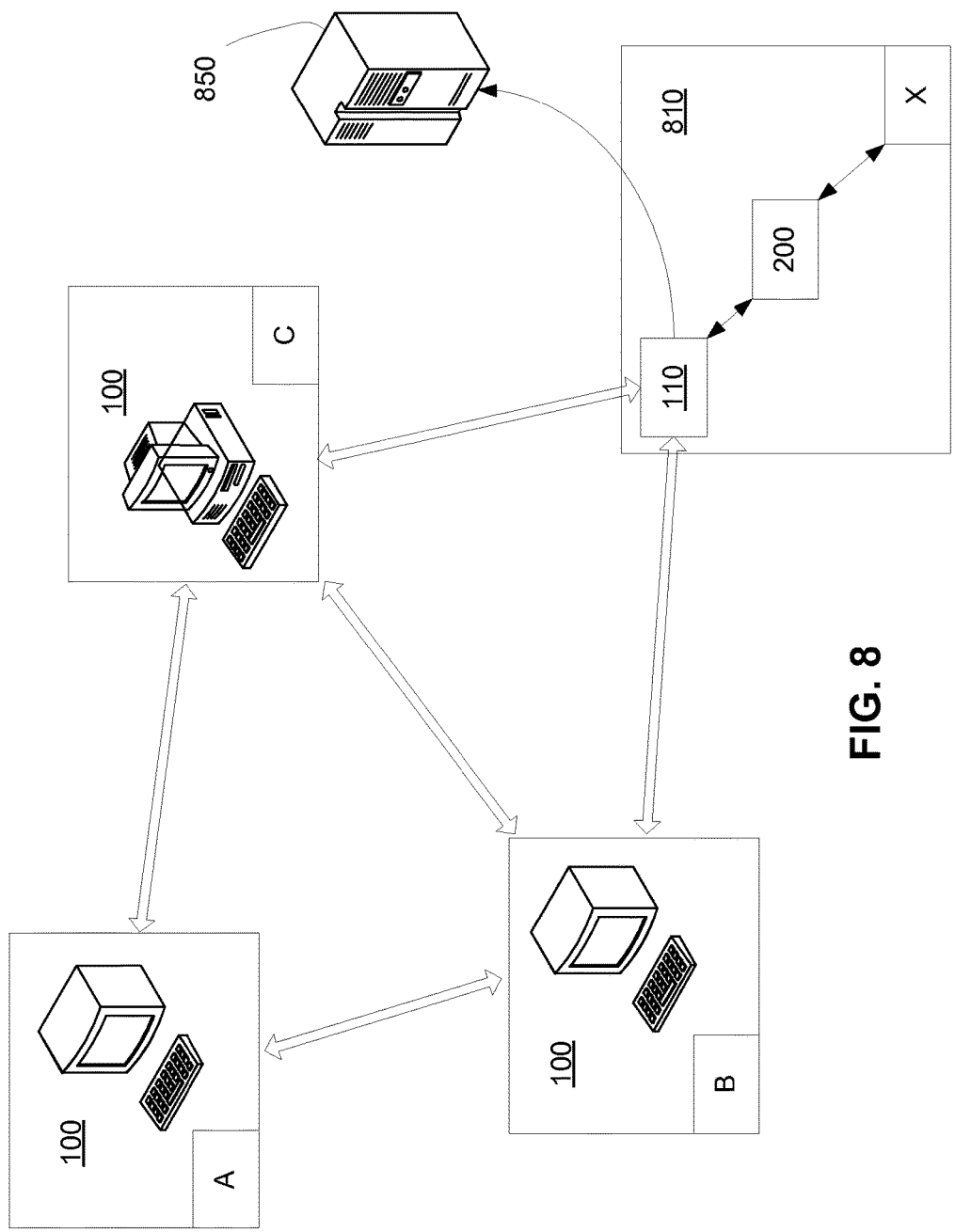
FIG. 8 is a flow diagram illustrating a particular example of a distributed task of determining the severity of maliciousness of an unknown program according to one embodiment of the invention

A concrete example of checking a program of unknown harmfulness is depicted in FIG. 8. An unknown program X is discovered on a first computer system 810 with the help of a local computer security suite 200; but whether X is a malicious program could not be verified (for example, due to the fact that the malware databases and whitelists were not updated more recently than a predetermined period of time). To determine the harmfulness of program X, the program or a representation thereof (for example, its hash sum, size, type of executable file, data taken from the header file, or other metadata or content summaries) are transferred to agent computers 100. In this case computer 810 is beneficiary computer 120.

In this example, each of agent computers 100 is configured to carry out a range of techniques for testing an unknown program based on respective criteria, identified as A, B, and C, through which it can be established whether or not program X is malicious. For instance, an emulator or virtual machine or proactive defense module can be used for testing the program. In another embodiment, one computer security suite 200 module may be used, but with different settings. In yet another embodiment, A, B, and C may refer to the various sets of features or parts of the database used by anti-virus software modules 200.

In a related embodiment, the results of the distributed processing may also be reported to anti-virus services company server 850, which can provide the results for further analysis and updating of the anti-virus company's own antivirus software databases, which would be disseminated to all users in the next update.

Figure 9:
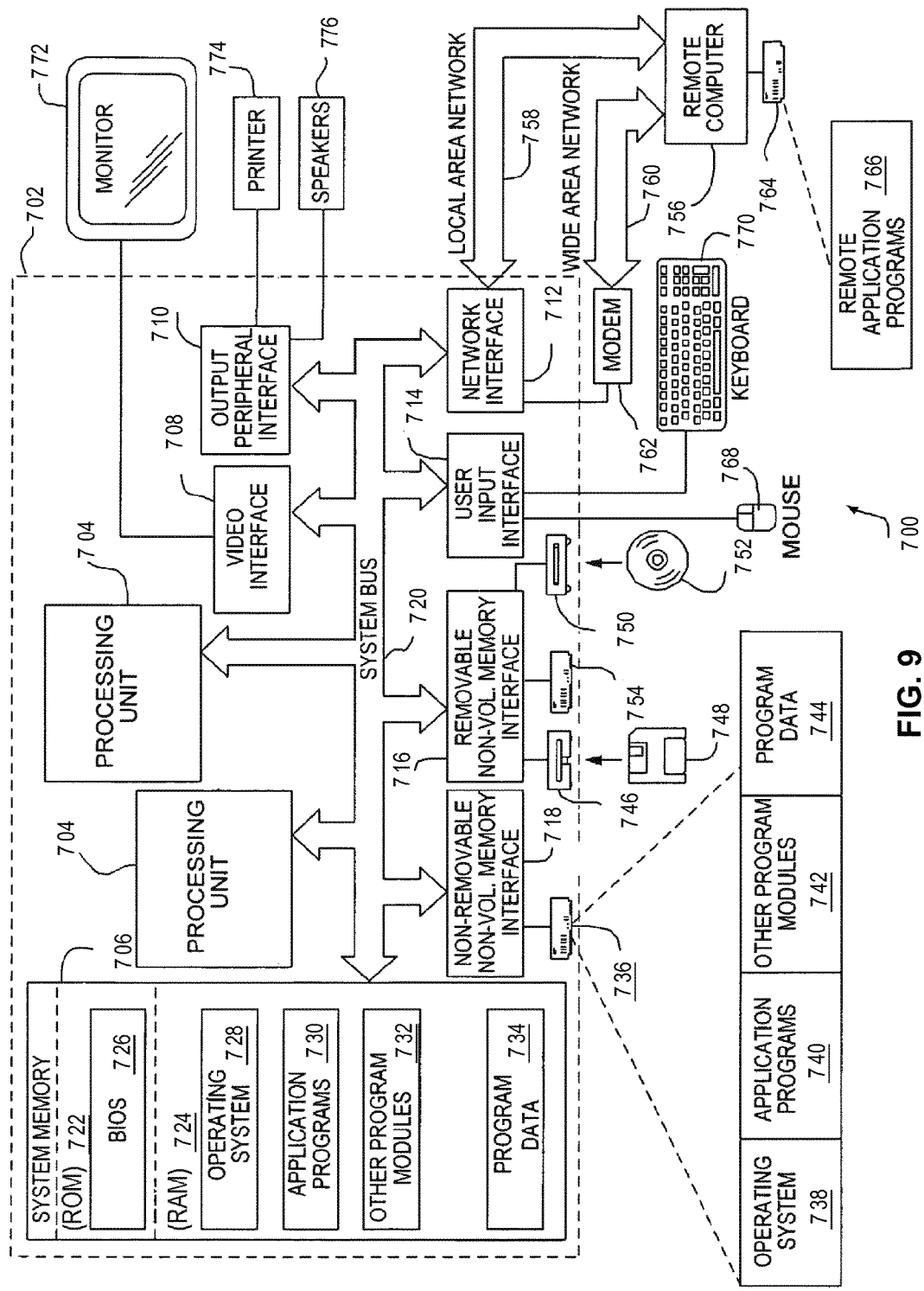
FIG. 9 is a block diagram illustrating a computer system on which aspects of the invention as described herein may be implemented according to various embodiments.

FIG. 9 is a diagram illustrating in greater detail a computer system 900 on which aspects of the invention as described herein may be implemented according to various embodiments. The computer system 900 may include a computing device such as a personal computer 902. The personal computer 902 includes one or more processing units 904, a system memory 906, a video interface 908, an output peripheral interface 910, a network interface 912, a user input interface 914, removable 916 and non-removable 918 memory interfaces and a system bus or high-speed communications channel 920 coupling the various components. In various embodiments, the processing units 904 may have multiple logical cores that are able to process information stored on computer readable media such as the system memory 906 or memory attached to the removable 916 and non-removable 918 memory interfaces 918. The computer 902 system memory 906 may include non-volatile memory such as Read Only Memory (ROM) 922 or volatile memory such as Random Access Memory (RAM) 924. The ROM 922 may include a basic input/output system (BIOS) 926 to help communicate with the other portion of the computer 902. The RAM 924 may store portions of various software applications such as the operating system 928, application programs 930 and other program modules 932. Further, the RAM 924 may store other information such as program or application data 934. In various embodiments, the RAM 924 stores information that requires low-latencies and efficient access, such as programs and data being manipulated or operated on. In various embodiments RAM 924 comprises Double Data Rate (DDR) memory, Error Correcting memory (ECC) or other memory technologies with varying latencies and configurations such as RAMBUS or DDR2 and DDR3. In this way, in various embodiments, the system memory 906 may store the input data store, access credential data store, operating memory data store, instruction set data store, analysis result data store and the operating memory data store. Further, in various embodiments, the processing units 904 may be configured to execute instructions that limit access to the aforementioned data stores by requiring access credential before access to the information is granted.

The removable 916 and non-removable 918 memory interfaces may couple the computer 902 to disk drives 936 such as SSD or rotational disk drives. These disk drives 936 may provide further storage for various software applications such as the operating system 938, application programs 940 and other program modules 942. Further, the disk drives 936 may store other information such as program or application data 944. In various embodiments, the disk drives 936 store information that doesn't require the same low-latencies as in other storage mediums. Further, the operating system 938, application program 940 data, program modules 942 and program or application data 944 may be the same information as that stored in the RAM 924 in various embodiments mentioned above or it may be different data potentially derivative of the RAM 924 stored data.

Further, the removable non-volatile memory interface 916 may couple the computer 902 to magnetic portable disk drives 946 that utilize magnetic media such as the floppy disk 948, Iomega® Zip or Jazz, or optical disk drives 950 that utilize optical media 952 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 902 may utilize the network interface 912 to communicate with one or more remote computers 956 over a local area network (LAN) 958 or a wide area network (WAN) 960. The network interface 912 may utilize a Network Interface Card (NIC) or other interface such as a modem 962 to enable communication. The modem 962 may enable communication over telephone lines, coaxial, fiber optic, powerline, or wirelessly. The remote computer 956 may contain a similar hardware and software configuration or may have a memory 964 that contains remote application programs 966 that may provide additional computer readable instructions to the computer 902. In various embodiments, the remote computer memory 964 can be utilized to store information such as identified file information that may be later downloaded to local system memory 906. Further, in various embodiments the remote computer 956 may be an application server, an administrative server, client computers, or a network appliance.

A user may enter information to the computer 902 using input devices connected to the user input interface 914 such as a mouse 968 and keyboard 970. Additionally, the input device may be a trackpad, fingerprint scanner, joystick, barcode scanner, media scanner or the like. The video interface 908 may provide visual information to a display such as a monitor 972. The video interface 908 may be an embedded interface or it may be a discrete interface. Further, the computer may utilize a plurality of video interfaces 908, network interfaces 912 and removable 916 and non-removable 918 interfaces in order to increase the flexibility in operation of the computer 902. Further, various embodiments utilize several monitors 972 and several video interfaces 908 to vary the performance and capabilities of the computer 902. Other computer interfaces may be included in computer 902 such as the output peripheral interface 910. This interface may be coupled to a printer 974 or speakers 976 or other peripherals to provide additional functionality to the computer 902.

Various alternative configurations and implementations of the computer 902 are within the spirit of the invention. These variations may include, without limitation, additional interfaces coupled to the system bus 920 such as universal serial bus (USB), printer port, game port, PCI bus, PCI Express or integrations of the various components described above into chipset components such as the northbridge or southbridge. For example, in various embodiments, the processing unit 904 may include an embedded memory controller (not shown) to enable more efficient transfer of data from the system memory 906 than the system bus 920 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An agent computer system for operation in a distributed computation system in which security-related tasks are delegated to agents via a distributed computing service for the benefit of a beneficiary computer, the agent computer system comprising:

computing hardware including a processor, a memory device, a user interface, and a communications interface;

a plurality of protectors interfaced with the computing hardware and adapted to cause the computing hardware to perform various security-related operations for a user of the agent computer system; and a distributed processor that includes:

a task acceptor adapted to compute a determination of suitability of the agent computer system to accept delegation of at least one task of the security-related tasks to be performed for the benefit of the beneficiary computer via the distributed computing service, the determination being made by the agent computer system exclusive of the beneficiary computer and including obtaining parameters of the at least one task that include computational requirements for performing the at least one task, determining a computing capacity of the agent computer system based on available resources, determining an operating system of the agent computer system, determining resource consumption of one or more applications installed on the agent computer system, and rendering a decision of whether the computing capacity is sufficient to meet the computational requirements, whether the operating system is sufficient to meet the computational requirements, and whether the resource consumption of the one or more applications is sufficient to meet the computational requirements, the determination further being made by obtaining and considering user parameters including a possibility relating to attempts by malicious programs to end processes of anti-virus applications, and information about conflicts with the anti-virus applications that can affect an effectiveness of the security-related tasks; and a task executor adapted to obtain the at least one task delegated from the beneficiary computer via the distributed computing service in response to the determination of the suitability of the agent computer system, and to execute the at least one task via at least one of the plurality of protectors.

2. The agent computer system of claim 1, wherein the task acceptor is further adapted to accept delegation of the at least one task that is requested by the beneficiary computer via the distributed computing service that includes an intermediary computer.

3. The agent computer system of claim 1, wherein the task executor is implemented in an isolated environment distinct from local processes and their resources.

4. The agent computer system of claim 1, wherein the task executor is adapted to execute the at least one task at a lower priority than other tasks being executed on the computing hardware on behalf of a local user of the agent computer system.

5. The agent computer system of claim 1, wherein the task acceptor is adapted to register the suitability of the agent computer system with the distributed computing service and to accept task processing requests sent from the distributed computing service in response to a registration of the suitability.

6. The agent computer system of claim 1, wherein the task acceptor is adapted to initiate a communication session with the distributed computing service and to read task processing requests provided by the distributed computing system in response to an initiation of the communication session.

7. The agent computer system of claim 1, further comprising:
a task delegator adapted to detect an opportunity to delegate a security-related task of the security-related tasks to be executed on a remote agent computer on behalf of the agent computer system, and to generate a request for the delegation of the security-related task to the distributed computing service.

8. The agent computer system of claim 1, further comprising:
a computing assessor coupled to the task acceptor and adapted to determine a computing capacity of the computing hardware,
wherein the determination of the suitability of the agent computer system to accept the delegation of the at least one task is based on the computing capacity.

9. The agent computer system of claim 1, further comprising:
a computing assessor coupled to the task acceptor and adapted to determine usage of resources of the agent computer system by applications running on the agent computer system,
wherein the determination of the suitability of the agent computer system to accept the delegation of the at least one task is based on the computing capacity.

10. The agent computer system of claim 1, further comprising:
a user activity tracker adapted to monitor a time of usage of the agent computer system by the user via the user interface,
wherein the determination of the suitability of the agent computer system to accept the delegation of the at least one task is based on the time of usage.

11. The agent computer system of claim 10, wherein the user activity tracker is further adapted to determine trends of the usage of the agent computer system by the user, and
wherein the determination of the suitability of the agent computer system to accept the delegation of the at least one task is based on the trends.

12. The agent computer system of claim 1, further comprising:
a task delegator adapted to initiate a request to the distributed computing service for the delegation of the at least one task to be performed for the benefit of the agent computer system by a remote agent computer.

13. The agent computer system of claim 1, further comprising:
a distributed computing servicer adapted to:
receive a request for distribution of the security-related tasks to be performed for the benefit of the beneficiary computer;
determine computing capacity requirements for executing each of the requested security-related tasks; and
delegate the requested security-related tasks to at least one remote agent computer for execution in response to a suitability determination as to whether each of the at least one remote agent computer is suitable to perform the execution.

14. A non-transitory computer-readable information storage medium comprising instructions that, when executed by a computer system for a benefit of a beneficiary computer, cause the computer system to:
perform various security-related operations for a user of the computer system;
compute a determination of suitability of the computer system to accept delegation of at least one task of the security-related tasks to be performed for the benefit of the beneficiary computer via a distributed computing service, the determination being made by the computer system exclusive of the beneficiary computer and including obtaining parameters of the at least one task that include computational requirements for performing the at least one task, determining computing capacity of the computer system based on available resources, determining an operating system of the computer system, determining resource consumption of one or more applications installed on the computer system, and rendering the determination of the suitability including whether the computing capacity is sufficient to meet the computational requirements, whether the operating system is sufficient to meet the computational requirements, and whether the resource consumption of the one or more applications is sufficient to meet the computational requirements, the determination further being made by obtaining and considering user parameters including a possibility relating to attempts by malicious programs to end processes of anti-virus applications, and information about conflicts with the anti-virus applications that can affect an effectiveness of the security-related tasks; and obtain the at least one task delegated for the benefit of the beneficiary computer via the distributed computing service in response to the determination of the suitability of the computer system, and to execute the at least one task via at least one of a plurality of protectors.

15. The non-transitory computer-readable medium of claim 14, wherein the instructions are further adapted to cause the computer system to:

receive a request for a distribution of the security-related tasks from at least one remote beneficiary computer;

determine computing capacity requirements for executing each of the requested security-related tasks; and delegate the requested security-related tasks to at least one remote agent computer for execution in response to the suitability determination.

* * * * *